(12) United States Patent
Mountford et al.

(10) Patent No.: US 6,629,645 B2
(45) Date of Patent: Oct. 7, 2003

(54) WATER MIXING VALVE APPARATUS

(75) Inventors: Colin Lander Mountford, Parkside (GB); Paul John Newcombe, Redhill (GB); Kelvin Paul Towler, Ashford (GB); Daniel James Flicos, Essex (GB); Jocelin Langford, Cullompton (GB); Micheal John Cox, Royston (GB)

(73) Assignee: Aqualisa Products Limited, Westerham (GB)

( * ) Notice: Subject to any disclaimer, the term of this patent is extended or adjusted under 35 U.S.C. 154(b) by 0 days.

(21) Appl. No.: 10/062,844

(22) Filed: Jan. 30, 2002

(65) Prior Publication Data

US 2002/0153425 A1 Oct. 24, 2002

(30) Foreign Application Priority Data

Jan. 30, 2001 (GB) .............................. 0102356

(51) Int. Cl.[7] .............................................. G05D 23/13
(52) U.S. Cl. ................. 236/12.12; 236/93 B; 236/93 R
(58) Field of Search ............................. 236/12.12, 91 R, 236/93 R, 93 B, 51, DIG. 2; 4/676, 677; 137/487.5

(56) References Cited

U.S. PATENT DOCUMENTS

| | | | | |
|---|---|---|---|---|
| 3,561,483 A | * | 2/1971 | Taplin .................... 137/625.4 |
| 3,561,484 A | * | 2/1971 | Taplin .................... 137/625.4 |
| 4,189,792 A | * | 2/1980 | Veach ........................... 4/677 |
| 4,854,498 A | | 8/1989 | Stayton ................... 236/12.12 |
| 4,909,435 A | * | 3/1990 | Kidouchi et al. ........ 236/12.12 |
| 4,941,608 A | * | 7/1990 | Shimizu et al. .......... 236/12.12 |
| 4,969,598 A | * | 11/1990 | Garris ..................... 236/12.12 |
| 5,032,992 A | | 7/1991 | Bergmann ................... 364/550 |
| 5,144,975 A | | 9/1992 | Polis ........................... 137/392 |
| 5,174,495 A | | 12/1992 | Eichholz et al. ......... 236/12.12 |
| 5,873,518 A | * | 2/1999 | Richmond et al. ....... 236/12.12 |
| 5,979,776 A | * | 11/1999 | Williams .................. 236/12.12 |
| 6,003,170 A | * | 12/1999 | Humpert et al. .............. 4/623 |
| 6,237,853 B1 | * | 5/2001 | Bergmann ............... 236/12.12 |
| 6,460,567 B1 | * | 10/2002 | Hansen et al. ............... 137/554 |

FOREIGN PATENT DOCUMENTS

| | | | | |
|---|---|---|---|---|
| EP | 227 916 | | 7/1987 | .......... G05D/23/13 |
| EP | 0 3000 639 | * | 1/1989 | ............. E03C/1/02 |
| EP | 375 259 | | 6/1990 | .......... G05D/23/13 |
| FR | 2582418 | | 5/1986 | .......... G05D/23/13 |
| GB | 2 143 343 | | 2/1985 | .......... G05D/23/13 |
| GB | 2 235 309 | | 2/1991 | .......... G05D/23/13 |
| GB | 2 263 755 | | 8/1993 | ........... F16K/15/18 |
| GB | 2 268 302 | | 1/1994 | ............. G07F/7/02 |
| JP | 63089909 | | 4/1988 | .......... G05D/23/00 |
| JP | 63089910 | | 4/1988 | .......... G05D/23/00 |
| JP | 2150581 | | 6/1990 | ........... F16K/29/00 |
| JP | 4331859 | | 11/1992 | ........... F16H/57/12 |
| WO | WO 98/26339 | | 6/1998 | .......... G05D/23/12 |
| WO | WO 99/57381 | | 11/1999 | ............. E03C/1/05 |

* cited by examiner

*Primary Examiner*—William E. Tapolcai
*Assistant Examiner*—Mohammad M. Ali
(74) *Attorney, Agent, or Firm*—Glenn Patent Group; Michael A. Glenn; Kirk D. Wong

(57) ABSTRACT

A mixing valve apparatus including a mixing valve for mixing water from a cold water inlet and a hot water inlet and supplying the mixed water to a water outlet, the water inlets and outlets being for connection to an external water system, a valve servo for moving the position of the valve, a control system for operating the valve servo and thereby controlling at least the temperature at the water outlet, wherein the control system characterises the external water system in which the mixing valve is connected and optimizes control of the valve according to the characterisation.

30 Claims, 10 Drawing Sheets

G1=G2
G2=(P1-P2)/(T1-T2)
G3=(P2-P3)/(T2-T3)
G4=(P3-P4)/(T3-T4)
G5=(P4-P5)/(T4-T5)
G6=G5

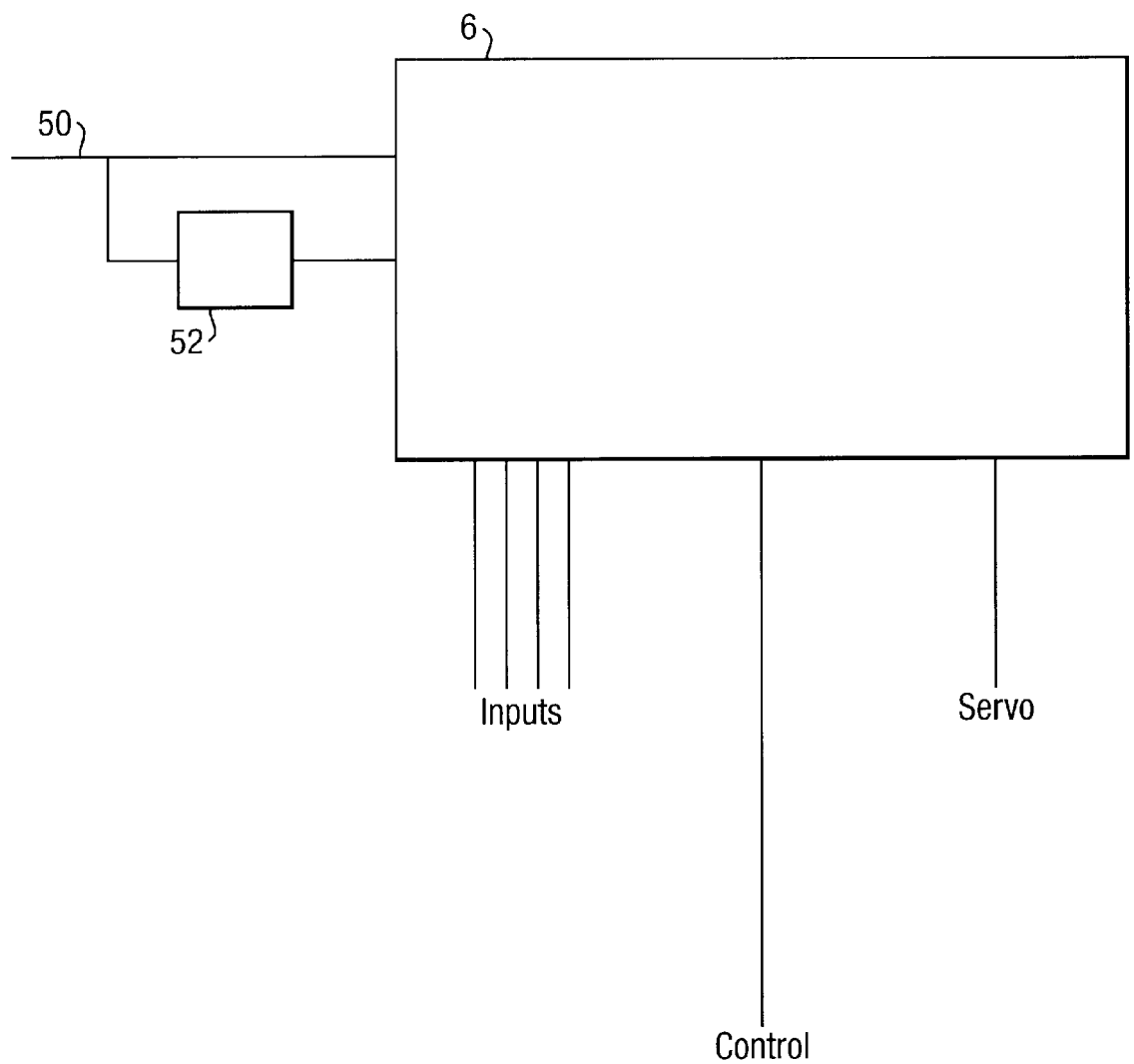

WATER MIXING VALVE APPARATUS

BACKGROUND OF THE INVENTION

1. Field of the Invention

The present invention relates to a water mixing valve apparatus and, more particularly, to improvements in the control system of a water mixing valve apparatus having a servo controlled mixing valve.

2. Description of the Related Art

Previously it was known to provide an electronically controlled mixing valve for mixing hot and cold water to provide outlet water of a desired temperature. The apparatus was provided with a control loop having a temperature sensor in the outlet of the mixing valve so that the mixing valve could be adjusted to provide a desired outlet temperature. It was also known to provide the mixing valve apparatus as part of a shower, e.g. for washing.

This known mixing valve apparatus has a problem when it is installed in a non-linear environment. For instance, where a mixing valve is installed in a water system having a higher pressure cold water supply, the first part of movement of the mixing valve will have little effect in raising the outlet temperature and the outlet temperature will be very sensitive to movement of the valve in a later small range.

OBJECTS AND SUMMARY OF THE INVENTION

To overcome this problem, it is possible to adapt the mixing valve for a particular pressure system, for instance by inserting restrictors in the inlet pipes. However, the installation of such restrictors is not a trivial matter and, unless the nature of a water system is known in advance, it is necessary to use trial and error to determine the correct restrictor. Furthermore, it is necessary to produce and stock a selection of different restrictors for different types of water system.

It is also possible to use a control loop which adjusts dynamically according to sensed operating conditions. However, this is unduly complicated and requires the control loop to reconfigure itself when the valve is moved between different portions of a stable, but non-linear environment.

According to the present invention, there is provided a mixing valve apparatus including:

a mixing valve for mixing water from a cold water inlet and a hot water inlet and supplying the mixed water to a water outlet, the water inlets and outlets being for connection to an external water system;

a valve servo for moving the position of the valve;

a control system for operating the valve servo and thereby controlling at least the temperature at the water outlet; wherein the control system characterises he external water system in which the mixing valve is connected and optimizes control of the valve according to he characterisation.

In this way, it is not necessary for different mixing valves to be provided for different installations or to provide additional parts to adapt the mixing valve for different installations. The control system can adapt the way it controls the mixing valve according to the properties of the external water system In particular, for a given temperature change at a particular point in the temperature range, the control system can move the mixing valve by a different amount according to how the external water system has been characterised. Where the control system uses an outlet temperature sensor with a control loop, it can optimise control of the valve by varying, according to the characterisation, the amount of movement of the valve to correct a difference between actual and desired temperature as detected by the temperature sensor. In other words, the control loop in effect employs a gain which varies through the valves range according to the characterisation.

However, for the particular characterization, appropriate gains are known for positions throughout the operating range and there is no need for the system to dynamically change the gain on the basis of sensed conditions. A respective characterization represents an entire operating range.

Preferably, the characterisation takes account of at least one of inlet water flows, pressures and temperatures. This enables the mixing valve apparatus to be optimised for a wide variety of external water systems.

The characterisation used by the control system can be selected by the user, for instance by means of an input selector. In this way, the user merely preselects the type of external water system in which the mixing valve apparatus is installed or changes the selection until an optimum response is observed.

On the other hand, the control system could automatically determine the characterisation on the basis of operating conditions of the valve.

In this way, the control system determines the characterisation of the external water system on the basis of the properties of the water at the outlet of the mixing valve compared to the controlled position of the valve to produce those properties.

Hence, the operating conditions may include the mixed temperature at the outlet and the position of the mixing valve. Furthermore, they may include the cold water inlet temperature or an estimation thereof. Similarly, the operating conditions can include a measure of the change of position of the mixing valve with respect to a change in the actual mixed water temperature at the outlet.

By additionally considering the cold water inlet temperature, the control system only requires data relating to two other operating positions to characterise the external system.

The operating conditions may additionally include the temperature of the input hot water.

In this way, the control system only requires data relating to one intermediate position of the valve to characterise the external system.

Thus, by using the input cold and/or hot water temperatures, the control system is able to characterise the external system more quickly and easily.

Preferably the control system is continuously adaptive such that, should the properties of the external system change, the characterisation will also change. In other words, the applicable response or gain for the operating range will change. However, in addition, the control system may also determine the characterisation of the external water system with respect to time. In this way, the control system can predict conditions where the properties of the external water system change over time. For instance, the control system could compensate for the temperature of the hot water inlet decreasing over time as the temperature in a hot water supply tank decreases. Similarly, the control system could compensate for dead leg in supply pipes according to time since the mixing valve was last used and/or changes as the temperature of a supply pipe comes up to the temperature of the water it carries.

Preferably, upon stat up, the control system makes use of the characterisation to move the valve to a position predicted to produce the required temperature at the water outlet.

Indeed, according to the present invention, there is provided a mixing valve apparatus including:
- a mixing valve for mixing water from a cold water inlet and a hot water inlet and supplying the mixed water to a water outlet, the inlets and outlets being for connection to an eternal water system;
- a valve servo for moving the position of the valve; and
- a control system for operating the valve servo and thereby controlling flow from the water outlet; wherein
- the control system stores information relating position of the valve and valve servo to temperature at the outlet such that, upon start-up, when a desired temperature is selected the valve servo is initially operated to move the valve to the position stored for the selected temperature.

Where the control system uses a temperature sensor in the outlet together with a control loop, the control system positions the valve without using the control loop for a short predetermined period of time. In this way, when the control loop is again used, the valve position and the actual temperature should be close to the required position and temperature such that the required temperature can be reached more quickly and with less oscillation in temperature.

Often mixing valves will be used in systems which are shut down and restarted within a short period of time. For instance, in a domestic shower, the shower may be turned off briefly while the user is applying soap or shampoo.

Preferably, when the mixing valve is not used only for a very short period of time, the control system assumes that the conditions of the water system have not changed and jump starts a start up control loop to restore the valve to its position as previously used.

According to the present invention, there is provided a mixing valve apparatus including:
- a mixing valve for mixing water from a cold water inlet and a hot water inlet and supplying the mixed water to a water outlet, the inlets and outlets being for connection to an external water system;
- a valve servo for moving the position of the valve; and
- a control system for operating the valve servo and thereby controlling flow from the water outlet, wherein
- when the mixing valve is not used only for a very short period of time, the control system assumes that the conditions of the external water system have not changed and jump starts a start-up control loop to restore the valve to its position as previously used.

In other words, irrespective of any other control systems or control loops, the valve may be driven directly to the position it had when it was last used.

In this way, the valve is moved directly to a position suitable for producing the desired outlet conditions. This is particularly useful for a mixing valve used to control both flow and temperature. Furthermore, by jump stating the start up control loop such that the control loop is at first ignored, the system avoids undue oscillations and time delay as the control loop brings he valve to its required position. The control loop may be activated once the valve has reached the required position.

In previous mixing valves for controlling the temperature of a water outlet, it was known to provide an intermediate maximum temperature stop so as to prevent use of the outlet above a preselected temperature. However, there is a problem that these stops can inadvertently be overridden.

According to the present invention, there is provided a mixing valve apparatus including:
- a mixing valve for variably mixing hot and cold water;
- a valve servo for moving the mixing valve;
- a control system for operating the valve servo so as to provide a desired mixed water temperature; and
- a control panel remote from the mixing valve and valve servo for providing a control signal to the control system to select the desired temperature; wherein
- the control system includes a maximum temperature selector by which a user may specify a maximum mixed water temperature selectable by the control panel; and wherein
- the control panel includes a display of selectable mixed water temperatures,
- the display only showing temperatures up to the selected maximum mixed water temperature and
- the display has a fixed predetermined extent, the scale of which is varied according to the selected maximum mixed water temperature.

In this way, users are only presented with available mixed water temperatures and, unlike previous systems where higher unselectable temperatures are displayed, no motivation is provided to select higher temperatures. Furthermore, the scale makes fill use of the available display and, furthermore, for low maximum temperatures, the scale can be increased to show changes in temperature with greater accuracy.

Preferably, the maximum temperature selector is provided proximate the mixing valve and the valve servo.

Since the control panel is provided remote from the mixing valve and the valve servo and since the maximum temperature selector is provided proximate the mixing valve and valve servo, it is not possible for a user to inadvertently change the temperature specified by the maximum temperature selector. Hence, a user may freely select temperatures using the control panel without any danger of selecting a temperature beyond that specified by the maximum temperature selector.

Despite this, by accessing the mixing valve and valve servo, it is still possible to provide a maximum temperature selector which easily adjusts the selected maximum temperature according to requirements.

The control panel may include a member movable between two predetermined end positions to select the mixed water temperature, one of the predetermined end positions selecting the selected maximum mixed water temperature and the scale of selectable mixed water temperatures between the two predetermined end positions being adjusted according to the selected maximum mixed water temperature.

In this way, for lower maximum temperatures, the full range of movement is still possible, such that temperatures may be selected with greater accuracy. This is applicable to sliders and also rotatable control knobs.

It should be noted that it would also be possible to provide a similar minimum temperature selector and to change the scales of the display and/or control member accordingly.

In previous systems where a flow of water is controlled by an electrically operable mixing valve, there has been a problem when power failures occur. In particular, without electrical power for the mixing valve, it remains in its open position. It has been proposed to provide mechanical actuators to allow the valve to be closed manually. However, these are inconvenient to use, particularly when the mixing valve is installed in a shower and, hence, the user is wet.

According to the present invention, there is provided a mixing valve apparatus including:
- a mixing valve for controlling flow of water;

a valve servo for moving the mixing valve;

a control system for operating the valve servo to move the mix valve;

an electrical power input for receiving power for the valve servo and control system; and an electrical energy store for powering tee valve servo and control system in the event that no power is received by the electrical power input, in such event, the control system operating the valve servo to move the valve to a position of no flow.

Hence, in the event of a power failure, the electrical energy store provides power to close the valve and shut off supply of water from the outlet.

This is particularly useful for valves having and preferably the apparatus has a valve member with apertures for hot and cold water and movable between a position of no flow and positions of mixed flow between maximum hot and maximum cold.

For these valves, a power failure may result also in changes in the external system providing the hot and cold water, such that the water outlet produces water which is unacceptably hot or cold. By means of the electrical energy store, it is possible safely to shut off the valve.

The valve member may provide a no flow position at two positions, one adjacent the maximum cold position and one adjacent the maximum hot position.

Although, in normal use, the valve member might be moved to the no flow position adjacent the maximum cold position, in the event that no power is received by the electrical power unit, the control system preferably operates the valve servo to move the valve member to the nearest of the two no flow positions.

In this way, the valve is moved to its off position most quickly and with the least amount of energy.

Preferably, in the event that no power is received by the electrical power unit, the control system switches off power to unnecessary components of the mixing valve apparatus so as to conserve power.

Thus, the control system only provides power to components essential for operating the mixing valve. For instance, any illumination of an associated control panel could be turned off.

In this way, depending on the size of the electrical energy store, it can be possible to continue operation of the mixing valve apparatus for some time before the valve servo moves the valve to a position of no flow.

In this respect, the control system could switch off power to any control loop for the valve on the basis that the operating conditions will not change over the short period of time following the power failure.

Preferably, the electrical energy store is a capacitor. This provides a longer service life than a battery and, also, allows energy storage at a higher voltage.

While power is received by the electrical power input, the capacitor may be charged to the highest possible safe voltage, for instance, at least 40 volts or a legislated maximum voltage, such as 42.4 volts.

In the event that no power is received by the electrical power input, the control system may determine the remaining electrical energy stored in the electrical energy store and operate the valve servo to move the valve to the position of no flow when the remaining electrical energy equals that needed to move the valve to the position of no flow.

In this way, for power failures of relatively short duration, it would be possible to continue operation of the mixing valve apparatus without interruption.

The valve servo may comprise a stepper motor. In this case, the control system preferably operates the stepper motor by half steps when power is received by the electrical power input and by whole steps in the event that no power is received by the electrical power input.

Preferably, in the event that no power is received by the electrical power input, the control system operates the valve servo to move the mixing valve to a position of no flow using the optimum servo trajectory resulting in the use of minimum power.

It will be appreciated that it is possible to operate a servo in many ways. In normal operation, the servo is usually operated to provide an optimum response by moving the valve quickly to a desired position Depending on the characteristics of the servo, it will also be possible to operate the servo in such a manner that it moves to a desired position with minimum use of power. By moving the mixing valve to a position of no flow using a minimum amount of power, the size of the electrical energy store may be minimised or the time during which the mixing valve apparatus may continue to operate during a power failure may be maximised.

In known electrically operated mixing valves, there is a problem of providing very accurate control of the mixing valve due to backlash in the gear train transferring motion to the mixing valve.

According to the present invention, there is provided a mixing valve apparatus including:

a mixing valve for mixing water from a cold water inlet and a hot water inlet and supplying the mixed water to a water outlet;

a stepper motor;

a gear train for transferring motion of the stepper motor to the mixing valve;

a detector for detecting at least one predetermined position of the mixing valve; and a control system for sequentially operating the stepper motor to move the mixing valve in one direction past said at least one predetermined position and in an opposite direction past said at least one predetermined position, thereby to determine with reference to the detector the back lash in the gear train.

In this way, when the control system is required to move the mixing valve in a direction opposite to the direction in which it was last moved, it can operate the stepper motor by an additional amount equal to the backlash in the gear train so as to move the mixing valve accurately to the required position. This can significantly improve the accuracy of the control system.

The control system is preferably responsive to a control signal to move the mixing valve to a position indicated by the control signal, the control system operating the stepper motor accordingly, taking account of the backlash in the gear train.

Thus the control signal could be derived from a temperature sensor in the water outlet for controlling the water outlet temperature. By correcting for the backlash in the gear train, it is then possible to move the mixing valve accurately as part of the control loop and make small changes in mixing valve position to more accurately control the outlet temperature.

Of course, the control signal may also be derived from a demand temperature input by a user.

In previous mixing valves, there has been a problem when the mixing valve is not operated for long periods of time. Due to stiction and such like between resilient seals and their sealing surfaces, undue strain can be placed on the valve servo and operating mechanism. Also additional wear and strain is placed on the resilient seals themselves.

According to the present invention, there is provided a mixing valve apparatus including:

- a valve having at least one sealing surface against which at least one resilient seal presses;
- a valve servo for moving the valve;
- a control system for operating the valve servo in response to a control signal; wherein
- in the absence of a control signal to move the valve within a predetermined period, the control system operates the valve automatically so as to keep the resilient seal from sticking to the sealing surface.

Preferably, the predetermined period is at least 24 hours. This is particularly useful for mixing valves used in showers. Showers are often used regularly at the same time each day. Hence, the control system will operate the valve servo if the shower is not operated by the user at this regular time.

Movement of the valve need only be sufficient to prevent the resilient seals from sticking to the sealing surfaces. Preferably, the valve is arranged such that it can be moved sufficiently to move the resilient seals relative to their sealing surfaces without the valve providing flow therethrough.

In this way, the external system in which the valve is installed will not be affected in any way by the operation.

Where a mixing valve is controlled by means of a control loop having a sensor in the outlet, it is often necessary to have a damped response. For example, where the control loop is used to maintain a particular temperature of water at the outlet, it is undesirable for the control loop to be undamped, since the system will unduly oscillate when moving to a new temperature and will overreact to changes in temperature resulting from minor changes to the inlet streams, for instance due to other usage on the same water supply. On the other hand, in certain circumstances, for instance a cold water supply failures it is extremely important that the system reacts quickly, for instance to shut off the water flow before a user becomes scalded.

According to the present invention, there is provided a mixing valve apparatus including:

- a mixing valve for mixing water from a cold water inlet and a hot water inlet and supplying the mixed water to a water outlet, the inlets and outlets being for connection to an external water system;
- a valve servo for moving the position of the valve; and
- a control system for operating the valve servo and thereby controlling flow from the water outlet, the control system including a temperature sensor for providing an indication of the temperature at the water outlet and a control loop for comparing the desired temperature with that provided by the temperature sensor so as to operate the valve servo; wherein
- the control system additionally includes a transient detector for determining transients in the water flow from the temperature indicated by the temperature sensor and overriding the control loop to control the valve servo in the event of a transient.

In this way, during normal usage, the control loop may provide the desired damped response for controlling the outlet temperature. However, when a transient is detected by the transient detector, the control loop can be overridden so as to allow the control system to take immediate action in view of the detected temperature changes.

In other words, the normal control loop no longer has control over movement of the valve and the transient detector causes the valve to be moved rapidly to a safe position.

It will be appreciated that the effect of damping is often provided by the temperature sensor itself, since, for normal use, this need only have a relatively slow response time.

Preferably, in the event of a transient the valve servo is controlled to rapidly reduce the supply of water from the hot water inlet to the water outlet to substantially zero.

Preferably, the transient detector continuously monitors the rate of change in temperature indicated by the temperature sensor.

In this way, the transient detector may predict the actual temperature at the water outlet from the rate of change in temperature indicated by the temperature sensor and the time constant of the temperature sensor.

In other words, knowing the time constant of the temperature sensor and, hence, the limit to which it can show a rate of change in temperature, when the temperature sensor indicates a rate of change at that limit, the transient detector can predict an actual rate of change which is much greater.

In this way, the transient detector can predict an unacceptable rise in temperature such that the control system can take appropriate action.

Significant problems can arise with previous electronically controlled mixing valves due to faults in the system. For instance, failure of a temperature sensor can cause the mixing valve to be moved to a position producing an unacceptably high or low temperature.

According to the present invention, there is provided a mixing valve apparatus including:

- a mixing valve for mixing water from a cold water inlet and a hot water inlet and supplying the mixed water to a water outlet, the inlets and outlets being for connection to an external water system;
- a valve servo for moving the position of the valve; and
- a control system for operating the valve servo and thereby controlling flow from the water outlet; wherein
- the control system includes an error detection circuit for detecting at least one of the following:
- failure of a temperature sensor providing an indication of the temperature at the outlet;
- failure of a selected intermediate maximum temperature for delivery from the outlet; and
- disconnection of a control panel for controlling the control system.

In this way, the mixing valve apparatus is able to operate safely despite any faults which may occur.

Upon detecting an error, the control system can operate the mixing valve in a fail-safe mode, for instance moving the valve to full cold, to a safe intermediate temperature or shutting off the flow of water from the outlet.

Preferably, the error detection circuit only recognises indications of the temperature between predetermined limits as valid temperatures and determines failure of the temperature sensor when the indication temperature is outside the predetermined limits.

The temperature limits may be set such that if the temperature sensor goes open circuit or closed circuit, the error detection circuit determines an error. This prevents the control system driving the valve to full cold or full hot in response to an erroneous signal indicating maximum or minimum temperature.

The intermediate maximum temperature may be selected using a potentiometer, the maximum selectable intermediate maximum temperature being selected with the potentiometer at its maximum resistance and a fixed resistor being provided in series with the potentiometer such that higher resistances are detected as errors.

In this way, if the potentiometer for selecting the intermediate maximum temperature becomes disconnected, the open circuit is not recognised as a high intermediate maximum temperature and the control system takes appropriate action; for instance issuing a warning and shutting off the valve or using an internal default intermediate maximum temperature.

Preferably, the sum temperature selectable as the intermediate maximum temperature corresponds to a closed circuit such that an unwanted short circuit fails safe.

In particular, if a short circuit occurs, the system reacts to this as if the minimum temperature has been selected as the intermediate maximum temperature. Hence, such a failure will not cause scalding of the user.

Preferably, the error detection circuit regularly checks for valid signals from the control panel and detects an error when no valid signal is received.

For analogue control panels, the error detection circuit checks for valid signal levels, and, for digital control panels, the error detection circuit checks that the control panel can communicate.

In this way, should the control panel fail or become disconnected, the control system can take appropriate action, for instance shutting off the valve.

According to the present invention, there is provided a mixing valve apparatus including:
  a mixing valve for mixing water from a cold water inlet and a hot water inlet and supplying the mixed water to a water outlet, the inlets and outlets being for connection to an external water system;
  a valve servo for moving the position of the valve; and
  a control system for operating the valve servo and thereby controlling flow from the water outlet; wherein
  the control system stores information relating position of the valve and valve servo to temperature at the outlet such that, upon start-up, when a desired temperature is selected the valve servo is initially operated to move the valve to the position stored for the selected temperature.

According to the present invention, there is provided a mixing valve apparatus including:
  a mixing valve for variably mixing hot and cold water;
  a valve servo for moving the mixing valve;
  a control system for connection to a remotely located control panel and for operating the valve servo so as to provide a desired mixed water temperature according to the control panel; wherein
  the control system includes an input port suitable for connection selectively to an analogue control panel and a digital control panel.

Preferably, the input port includes six lines of which two lines are suitable for analog control signals.

Preferably the input port includes an input termination circuit.

Preferably the input termination circuit includes;
  a first capacitor between ground and an input port;
  a first resistor between the input port and a digital input;
  a second resistor between the input port and au analog input; and
  a second capacitor between the analog input and ground; wherein
  the second resistor has a higher impedance with respect to the first resistor.

According to the present invention, there is provided a method of communicating with a mixing valve apparatus having a mixing valve for variably mixing hot and cold water, a valve servo for moving the mixing valve and a control system with a digital interface allowing input of a digital signal so as to cause the control system to operate the valve servo and provide a desired nixed water temperature, the method comprising:
  providing a control message of 8 bits having, in order, a destination address byte, a source address byte, a command number byte, three payload bytes and two CRC bytes.

Preferably, the command number has at least six values representing respectively report system status, switch valve on or off, set temperature, switch pump on or off, report temperature and report pump status.

It should be noted that any of the features discussed above can be combined together in any combination in a water mixing valve apparatus so as to give rise to a mixing valve apparatus having the corresponding advantages.

BRIEF DESCRIPTION OF THE DRAWINGS

FIG. 8 illustrates a control system using an additional electrical energy store.

DETAILED DESCRIPTION OF THE PREFERRED EMBODIMENTS

The invention will be more clearly understood from the following description, given by way of example only, with reference to the accompanying drawings.

Figure 1:
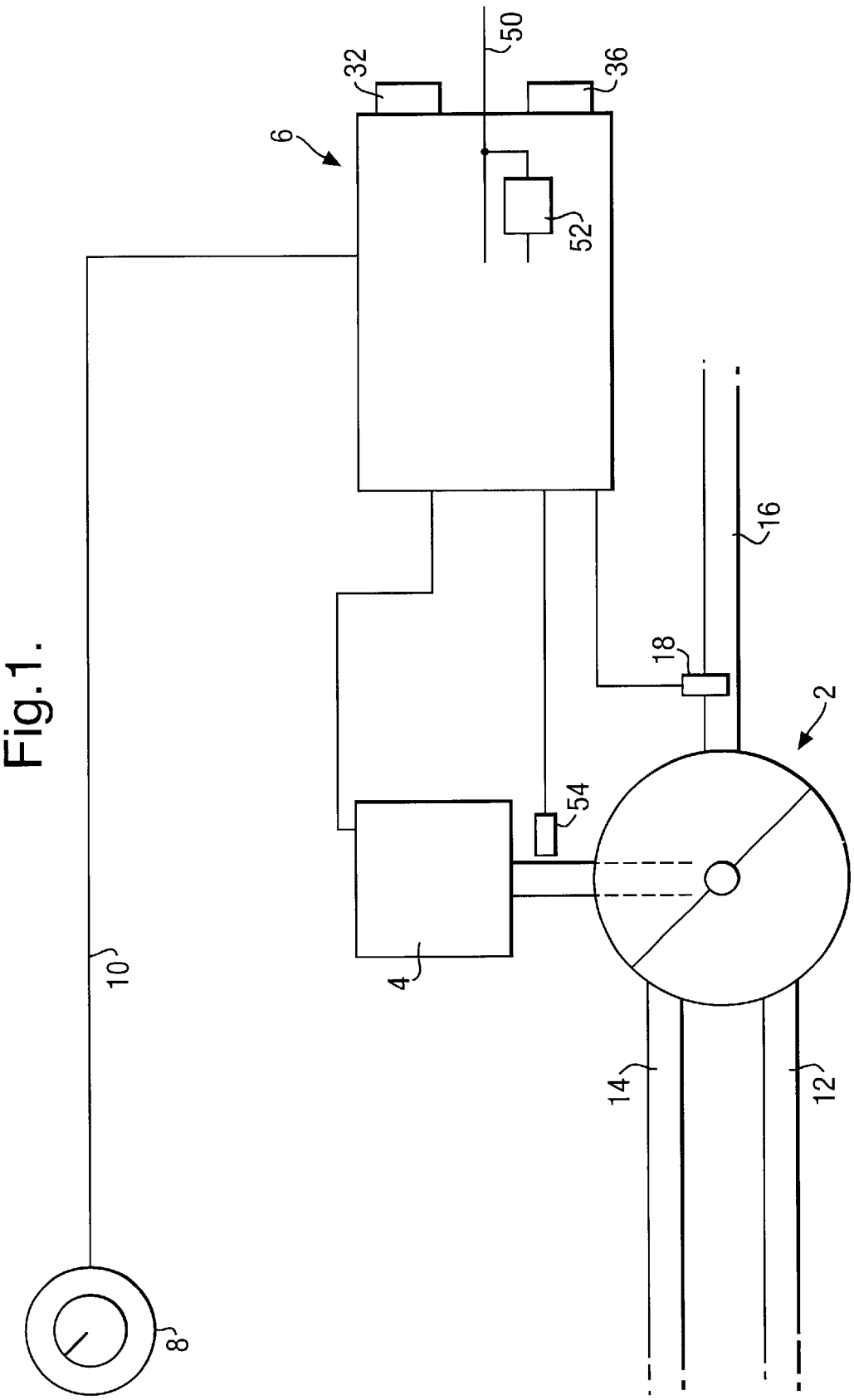
FIG. 1 illustrates schematically a remote controlled water mixing valve apparatus embodying the present invention.

As illustrated in FIG 1, the water mixing apparatus includes a mixing valve 2 which is operated by a valve servo 4 under the control of a control system 6. The control system 6 receives a control signal from a remote control panel 8.

As illustrated, the control panel 8 is connected to the control system 6 by means of a cable or wire 10. However, any appropriate communication may be provided between the control panel 8 and control system 6, including wireless systems. The control panel 8 is at least able to indicate in the control signal a desired water outlet temperature. However, it may also indicate other properties to the control system 6 in the control signal. Furthermore, a signal may be transmitted from the control system 6 to the control panel 8 in order to display information on the control panel 8.

The mixing valve 2 includes at least two inlets 12 and 14. These inlets 12, 14 are respectively for transfer fluid of different properties to the mixing valve 2. Hence, inlet 12 may provide a flow of cold water to the mixing valve 2 and inlet 14 may provide a flow of hot water to the mixing valve 2.

Fluid mixed by the mixing valve 2 flows out of the mixing valve 2 via an outlet 16.

As mentioned above, the mixing valve 2 is operated by means of a valve servo 4, for example a stepper motor. The valve servo 4 is controlled by the control system 6 so as to move the mixing valve 2 to a position providing the desired mixed output flow through outlet 16.

FIG. 1 illustrates a temperature sensor 18 located in the mixed flow of fluid so as to detect the temperature of mixed fluid. As illustrated, the temperature sensor 18 is positioned in the outlet 16. However, the temperature sensor 18 can also be positioned in the mixing chamber of the mixing valve 2 provided that it is at a position which will give a correct representation of the mixed outlet temperature.

By means of the temperature sensor 18, the control system 6 can operate the valve servo 4 so as to move the mixing valve 2 to a position providing a desired output temperature.

Figure 2:
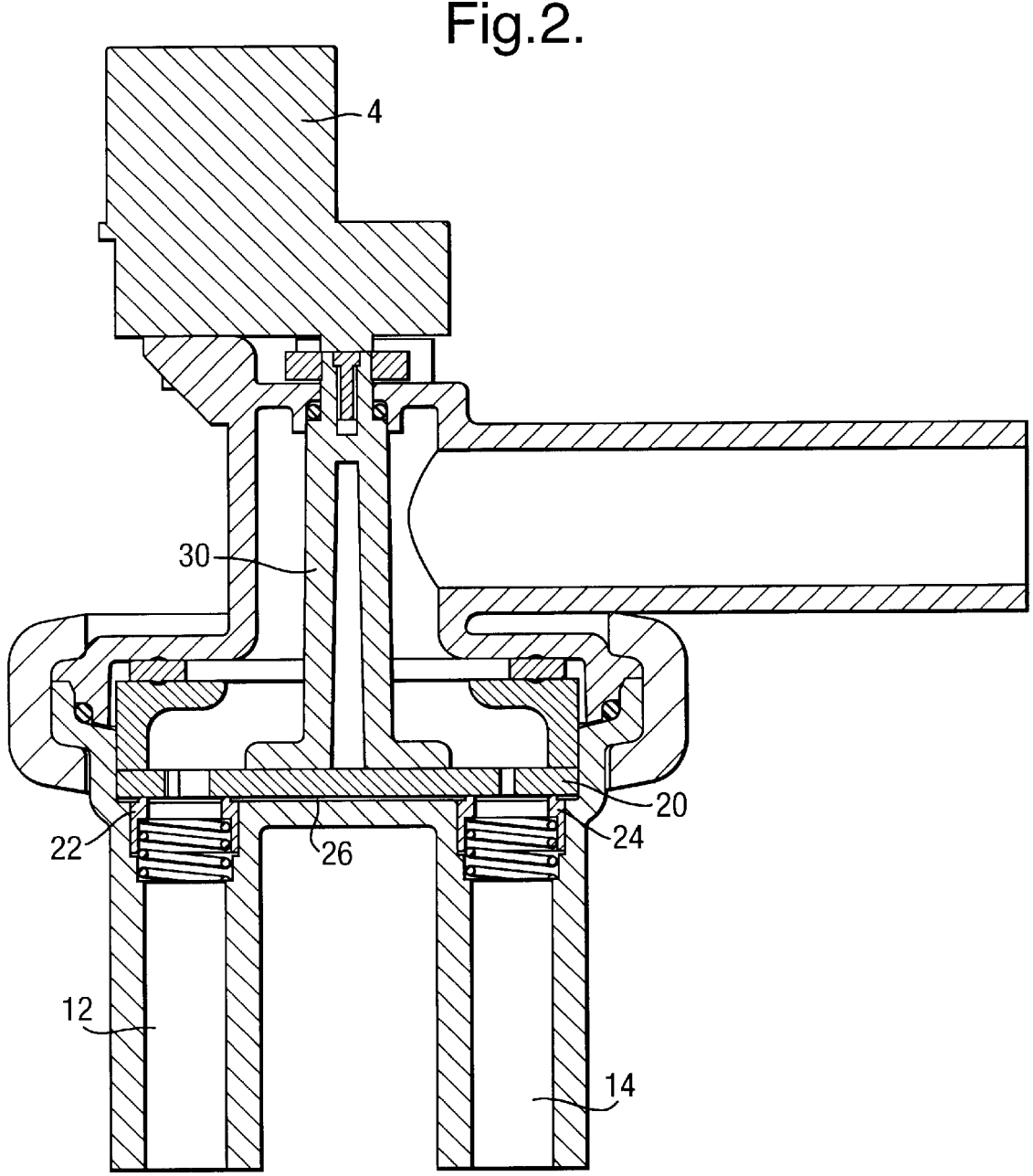
FIG. 2 illustrates a cross section through a valve suitable for use with the present invention.
Figure 3:
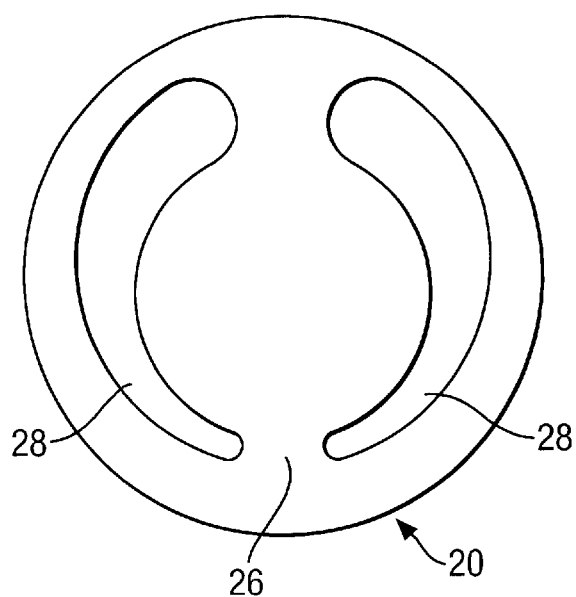
FIG. 3 illustrates a valve member for use in the valve of FIG. 2.

FIG. 2 illustrates a cross-section through a preferred mixing valve 2 for use in the apparatus of FIG. 1 The mixing valve 2 includes a valve member 20 as illustrated in FIG. 3.

Inlets 12,14 include cup seals 22,24 which seal against the face 26 of valve member 20.

As illustrated in FIG. 3, valve member 20 includes tapered apertures 28. In this way, by rotating the valve member 20 relative to the cup seals 22,24 of the inlets 12,14, one of the inlets is opened fully to the mixing chamber of the mixing valve 2 and then, as flow from that inlet is progressively reduced, flow from the other inlet is progressively increased. In this way, any desired mix from the inlets 12,14 can be obtained.

As illustrated in FIG. 2, the valve member 20 may be rotated by a shaft 30 extending through the mixing valve 2. The shaft 30 is rotated by the valve servo 4 either directly or by means of a gear train. The gear train may be provided separately or may be housed internally of the valve servo 4.

It should be appreciated that other arrangements of servo operated mixing valves are also possible.

Where the mixing valve 2 is used in a system having equal pressure and flow characteristics for the supply to both inlets 12 and 14, it is possible to provide a linear mixing response with respect to movement of the valve. For mixing hot and cold fluids, this is illustrated by the solid line in the graph of FIG. 4.

Figure 4:
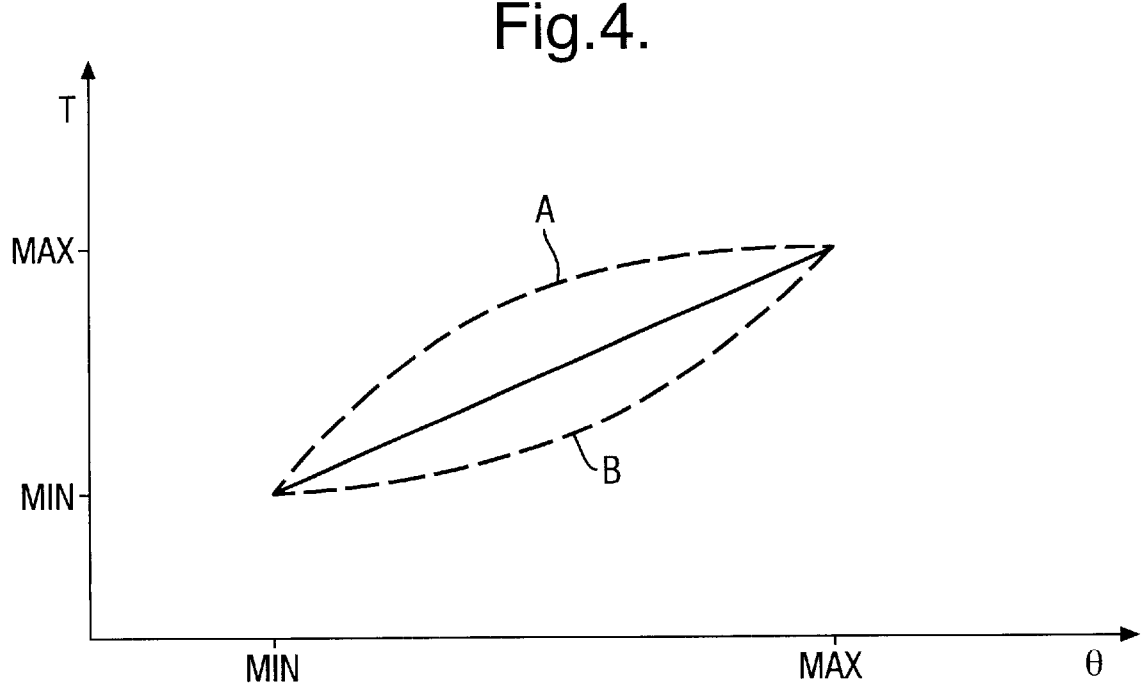
FIG. 4 illustrates typical profiles for the mixing of hot and cold water supplies.

In practice, the system will have different pressure and flow characteristics on different supply pipes. In particular, for a domestic water supply, where hot and cold water is supplied to the mixing valve 2, the cold water may be of higher pressure than the hot water or the hot water of higher pressure than the cold water. These two situations are illustrated in FIG. 4. In particular, where the hot water is of higher pressure than the cold water, the mixed outlet temperature will follow the characteristic illustrated by the broken line of FIG. 4 with reference A. On the other hand, if the cold water is of higher pressure than the hot water, the outlet temperature will follow the characteristic illustrated by the broken line of FIG. 4 having reference B. Thus, it will be appreciated that the system in which the mixing valve is installed can be classed as having a particular characterisation.

For the example given above, the water system can most simply be characterised as having one of three characterisations, namely a high pressure hot water system, an equal pressure system or a high pressure cold water system.

Having recognised the above it is now proposed to provide the control system with a user operable switch 32 allowing selection of the appropriate characterisation for the system in which the mixing valve apparatus is installed. In one arrangement, the switch 32 could be provided with only three states corresponding respectively to the three basic characterisations Equally, in another arrangement, it could be provided with additional states for intermediate characterisations. Alternatively, the switch could allow continuous selection of characterisations within a predetermined range.

On the basis of the characterisation, the control system 6 is able to operate the valve servo 4 in a manner to optimise the response of the system, thereby achieving higher response times and a more stable control. In particular, the control system 6 adjusts the position of the valve 2 at a rate appropriate with the actual change in mixing resulting from a change in position. In this way, the control system 6 can make the response of the control as fast as possible and also minimise overshoot.

In this respect, it will be appreciated that where there is a control loop, for instance as provided by the temperature sensor 18 of FIG. 1, the control system 6 is able to select any desired output mix even without knowing the characterisation of the external system. However, by knowing the characterisation of the external system, the control system 6 can operate the valve servo 4 to move the mixing valve 2 more or less than would otherwise be expected for a given change of mix at the outlet. Thus, for example, for the characteristic A in FIG. 4, the control system 6 would operate the valve servo 4 to move the valve 2 less for temperatures at the lower end of the temperature range than for temperatures at the higher end of the temperature range. In other words, the gain varies with valve position and this information is used to optimize the control loop.

Hence, an appropriate characterization defining the relationship between valve position and outlet temperature for at least the usual operating range is chosen. This is then used to obtain any desired outlet temperature. Control loop gain need not be varied dynamically during movement of the valve between different positions since the characterization of the external system is sufficient for optimising control over at least the usual operating range Instead of or in addition to the user selection switch 32, it is possible to provide a control system 6 which automatically determines the characteristics of the system in which the mixing valve apparatus is installed. In particular, the control system 6 can automatically choose one of a predetermined number of different characterizations. It can compare how much it instructs the valve servo 4 to move the mixing valve 2 with respect to detected changes in mix, for instance changes in the temperature detected by the temperature sensor 18. As a result, the control system can alternatively build up a profile of the mix response and, hence, control the mixing valve 2 more effectively. Once again, however, the resulting profile forms a characterization representing the operating range, thereby allowing the valve to be moved freely between different positions and outlet temperatures without the need to dynamically adjust control loop gain for each new position.

Preferably, the control system 6 monitors the response curve on a continuous basis such that, if the response changes over time, the control system 6 changes its characterisation of the external system and changes its control of the valve servo 4 accordingly. Thus, the control system 6 may undergo a continuous learning process.

For a general system, in order to have a complete and accurate profile for the characterisation, the control system 6 must operate the mixing valve 2 through the complete range of positions and resulting mixes. In this way, the control system 6 can build up any profile, even a profile of irregular form which does not correspond to any of the profiles illustrated in FIG. 4.

In some circumstances, it may be undesirable for the valve to be moved through its complete range because it will take time and because a user may only want the mixing valve to operate with a single predetermined mix.

However, by assuming that the characterisation can be approximated by one of a predetermined selection of profiles such as those illustrated in FIG. 4, it is possible to more quickly and easily determine an appropriate characterisation. In particular, by establishing at least 3 points with regard to valve position and mix properties, it is possible to estimate an appropriate profile and to establish the required characteristics for the control system.

For mixing hot and cold fluids, it is proposed to measure or at least estimate the input cold temperature. This then gives the control system 6 the lowest point of the profile as illustrated in FIG. 4 and allows the control system 6 to predict an appropriate characterisation based on only two other points on the temperature/position profile.

It is possible to use a temperature sensor (not illustrated) in the cold inlet 12 to determine the cold temperature. However, an alternative is to use the temperature measured by temperature sensor 18 upon start-up. It will be appreciated that most systems, there will be some dead lag, i.e. a length of fluid in the pipes, between the hot fluid supply and the mixing valve 2. Hence, upon start-up, no hot fluid will be mixed with the cold fluid and the temperature measured by the temperature sensor 18 will be the temperature of the dead lag of fluid. This temperature will usually be the ambient temperature of the building in which the system is installed. This, in turn, will be will be representative of the cold fluid temperature, though, in practice, will usually be slightly higher.

In order to further assist in the efficient recognition of an appropriate characterisation, the control system 6 could measure the hot fluid temperature in the hot inlet 14. This is not essential, but could be achieved using a temperature sensor (not illustrated) in the hot inlet 14. In this way, the control system 6 would know the end points of the temperature profile and could estimate an appropriate characterisation with only one intermediate value for valve position versus outlet temperature.

It should be appreciated that the characterisation determined by the control system 6 is not limited only to the expected non linear profiles represented in FIG. 4 and discussed above. In particular, as mentioned above, by monitoring operating conditions of the apparatus on an ongoing basis, the control system 6 can build up a representation of any characteristics of any system.

Following on from the above, it will be appreciated that the characteristics of a system can change with time. For instance, for a domestic water system after start-up, the temperature of the hot water at the hot water inlet 14 may increase as the supply pipes are brought up to the temperature of the hot water. Alternatively, one of the supplies may be fed from a source which decreases in pressure as water is used.

The control system 6 may, therefore, monitor and keep a record of characterisation with respect to time. In this way, the control system 6 can change the characterisation which it applies to the system over time following start-up of the fluid flow.

The control system may also choose an appropriate characterisation according to how long the mixing valve 2 has been in a no-flow state with both inlets 12,14 shut off. For example, in a domestic water supply, if the mixing valve 2 has been in a no-flow state for only 15 minutes, the water and pipes between the hot water source and the mixing valve 2 will not have cooled to room temperature so that, upon start-up, the control system 6 can apply a characterisation more appropriate than the usual. start-up characterisation.

On the other hand, if the mixing valve 2 is in the no-flow state for only a very short period of time, for instance 1 minute, then the control system 6 can assume that the operating conditions of the apparatus have not changed at all. In this way, the control system 6 can immediately apply the same characterisation as was used before the apparatus was shut down Where the control system does not store separate characterisations for various types of start-up as discussed above, it is still possible for it to optimise the start up procedure. In particular, the control system 6 can mate use of its characterisations for normal running conditions and/or a record of the position of the valve 2 immediately before shut down.

When the mixing valve is tuned on again only a short while after being turned off (for instance, a few minutes), then the input conditions can be assumed to have not changed. In this situation, if the demand mix has not changed since last use, the valve 2 can be driven immediately to the last stable position. Similarly, the control system 6 can assume that he previous characterisation still applies and drive the valve immediately to the position appropriate for the requested mix. In this way, the control system 6 ignores the current conditions, for instance as indicated by the temperature sensor 18 and the associated control loop, and returns control of the valve 2 to the control loop after only a short wait of for instance about 3 seconds. This gives the fastest possible start-up time.

Where the mixing valve is turned on again after a long time of being off, for instance more than a few minutes, then the input conditions can be assumed to have changed. However, even in these circumstances, it is still possible to make use of the normal working characterisation used by the control system 6 to drive the valve to approximately the right position, i.e. using the learnt data about the average valve position for a given mix as represented by the characterisation. In these circumstance the control loop is restarted after a longer wait, for instance about 20 seconds, or if the mix is detected, for instance by the temperature sensor 18, to be nearing the demand conditions. Thus, in the case of a domestic water supply, this ensures a more stable response in the system when the dead leg in the hot water supply has passed and hot water first reaches the mixing valve 2. As will be discussed below, with such an installation, the system can also incorporate a further safety feature such that, if the temperature sensor 18 indicates an illegally high temperature the control system 6 overrides the processes discussed above and drives the mixing valve 2 to fill cold anyway.

In order to control the valve, the control system 6 may use a PID controller, since it is flexible enough to provide a stable and safe response for most conditions. However, it is difficult to optimise through calculation, simulation or experimentation.

It is possible to deduce all of the plant and system time responses to a reasonable level of accuracy by experimentation and approximation to sample time dependent functions, i.e. experimentation to establish the velocity profiles of the motor. Therefore it is possible to calculate controller parameters for an optimum response. By reducing the order of the controller, this task is made relatively simple.

Figure 5:
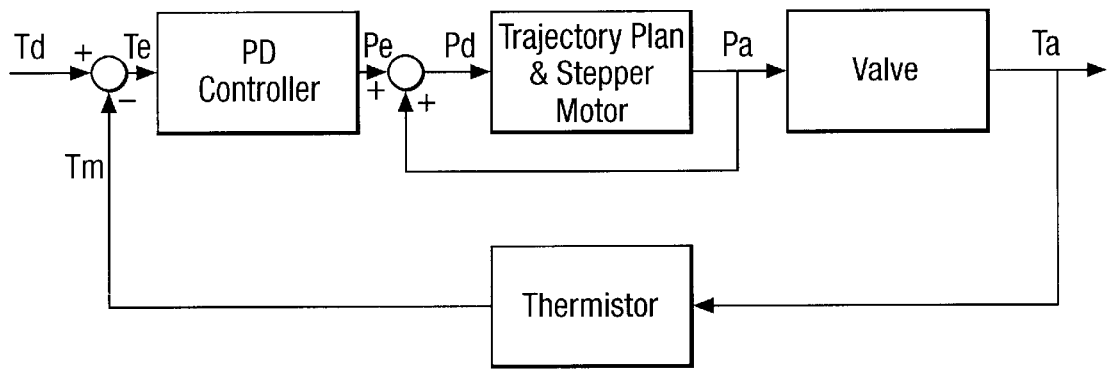
FIG. 5 illustrates schematically a control loop for the control system of FIG. 1.

The integral term can be removed from the controller if the controller output indicates the positional error rather than the absolute position. FIG. 5 illustrates an appropriate arrangement.

To provide the trajectory planner with an absolute position, the actual position (Pa) needs to be added to the position error (Pe) to give a demand position (Pd). This local feedback loop will insure the motor is driven as fast as possible at all times.

The derivative term gives an output proportional to the rate of change of error. This gives two advantages. Firstly, in response to sudden temperature errors (eg. water pressure disturbances), the derivative action will produce a large compensating controller action Secondly, when the actuator is moving towards the demand temperature at speed, the derivative term will produce an output to slow the actuator. In this way, as the derivative term is increased, the proportional term can also be increased, improving the controller rise time.

The derivative term is limited primarily by system noise. As the derivative gain is increased, the noise which contains fast edges will cause the actuator to 'chatter' resulting in unnecessary motor and gear wear. The proportional gain is mainly limited by the thermistor time response.

With regard to the adaptive strategy discussed above, the time constants of the system can be considered fixed so it is only the instantaneous gain of the plant that is needed to keep the control loop critically damped. Start-up is also important and data about the correct position for a given temperature will allow an optimal start-up response. One limitation is that there is little time to perform complex mathematical functions on-line. Thus, if these have taken place they are preferably carried out off-line. The controller may calculate the new gain value when off in preparation for the next time the valve is operated. It does this because the processing overhead to calculate the new gas is quite high. A low cost microcontroller does not have sufficient processing power to rum the control algorithms and calculate the new gains at the same time. When the valve is off, the microcontroller has virtually no other processing to perform It is proposed that the valve should operate with 0.1. second cycle during which the algorithm checks the demand temperature, actual temperature, compares the two and calculates the error, then knowing the previous error the control can carry out any adjustment required. Significant processing speeds would be required to constantly re-calculate the gain values within the 0.1 second cycles.

Figure 6:
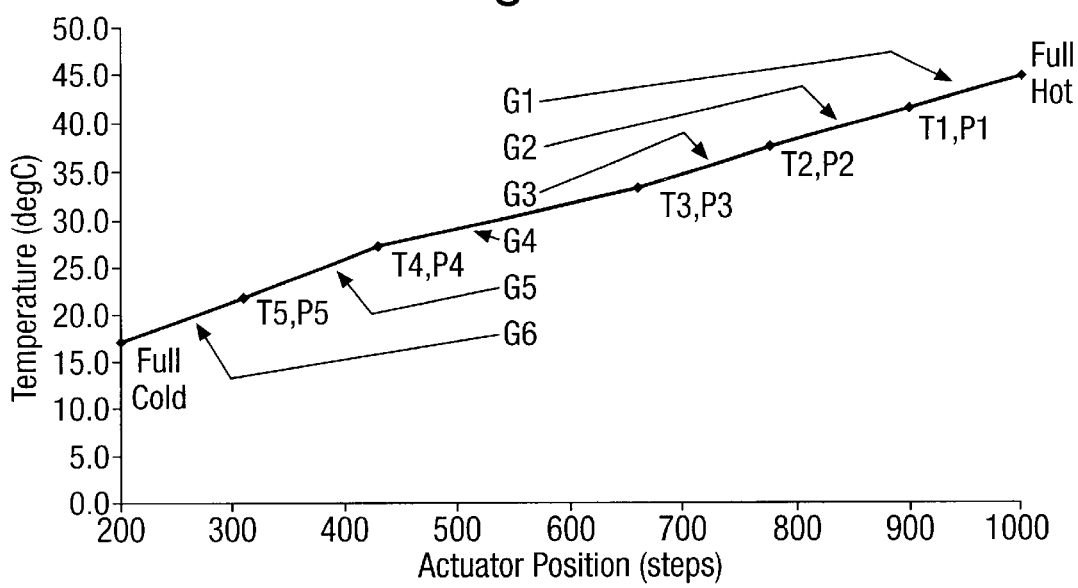
FIG. 6 illustrates the profile for an external water system as split into temperature bands.

According to one embodiment, the plant response is split into 5 temperature bands and within each of these bands a single temperature/position co-ordinate is stored. This is illustrated in FIG. 6. The co-ordinate is derived from a running average of stable points reached in this temperature band. The gain is defined by the number of actuator steps needed for a 1 degree change in temperature and is calculated off-line between each of the stored coordinates. The gain is extrapolated above and below the top and bottom points. Where no data has been collected a predefined 'safe' gain is used.

With respect to the system of FIG. 5, only the controller (PD or otherwise) is adaptive and the correct gain is selected for the current temperature or position. It is defined as being proportional to the inverse of the plant gain. The constant of proportionality is tunable.

On start-up, if data has been collected in the same temperature band as the demand temperature then a demand position is interpolated from the nearest recorded co-ordinate using the stored gain. The valve can thus be moved directly to the calculated position. The system will leave this mode if the demand temperature is reached or if the demand temperature is changed. The system will also leave this mode after a predetermined time. This time should be set slightly longer than the expected cold dead leg time (cold water in the hot pipe) as it will stop the actuator moving to the full hot position.

Figure 9:
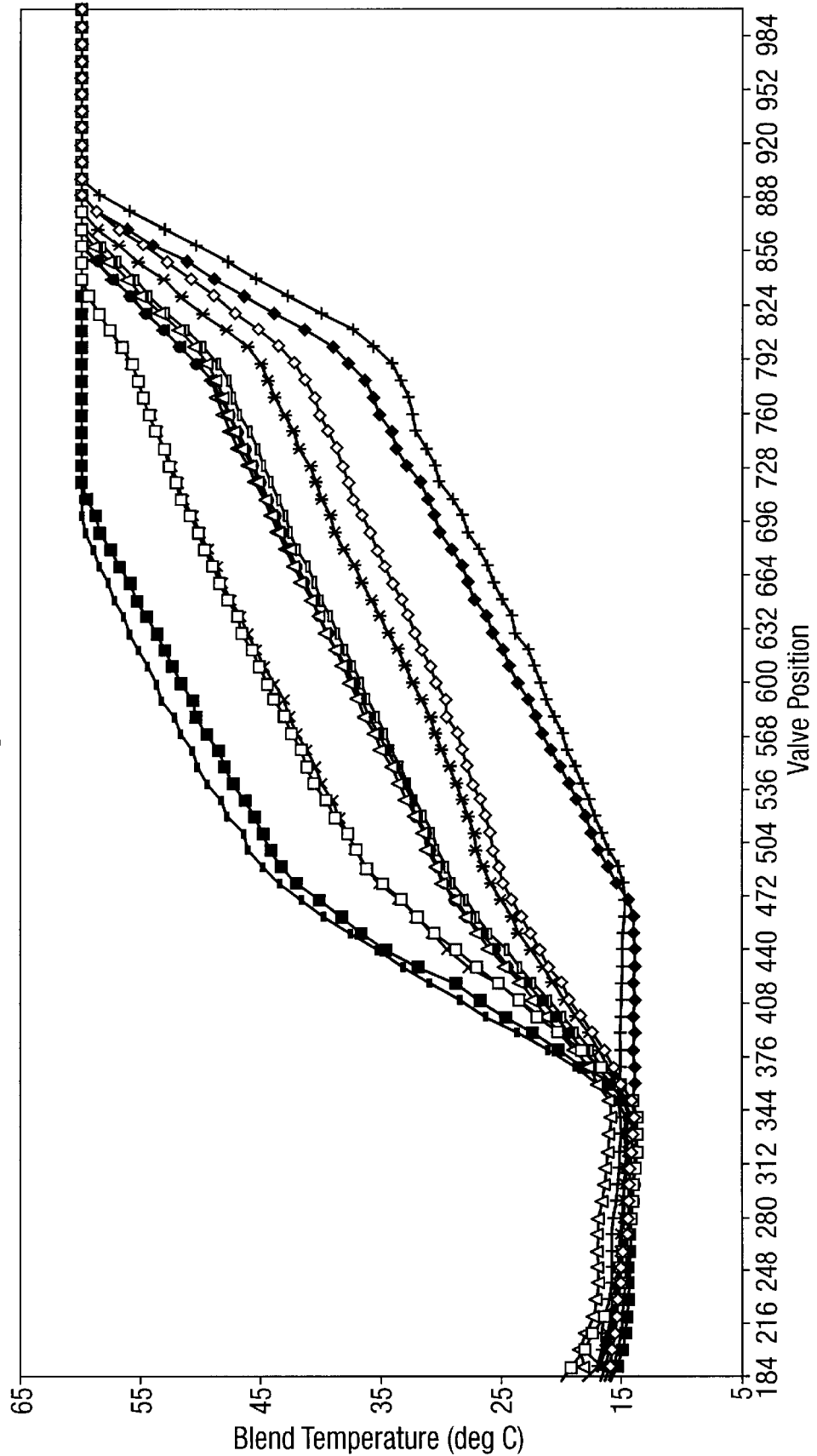
FIG. 9 illustrates examples of temperature versus valve position.
Figure 10:
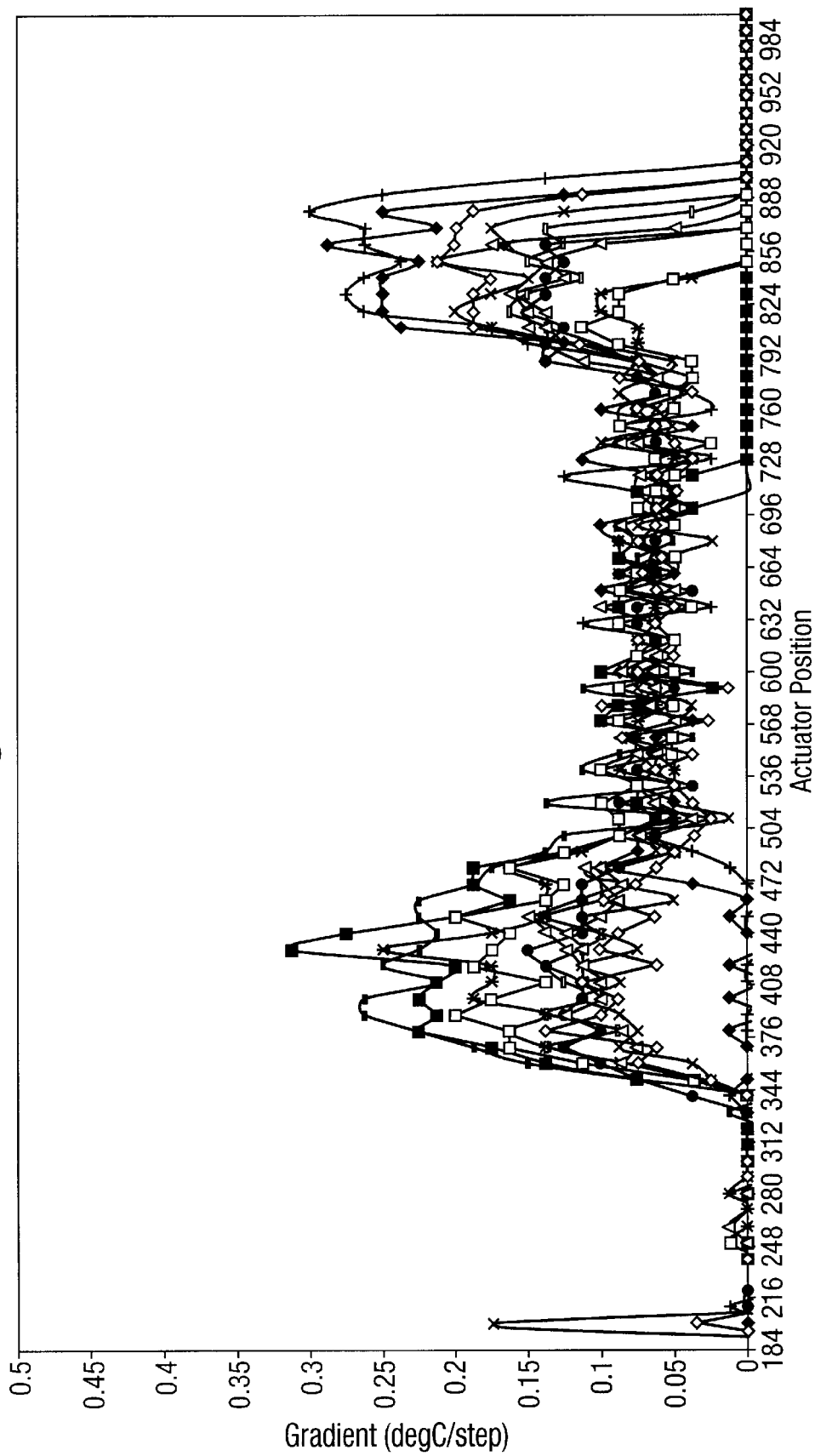
FIG. 10 illustrates a graph of gradients of the curves of FIG. 9.
Figure 11:
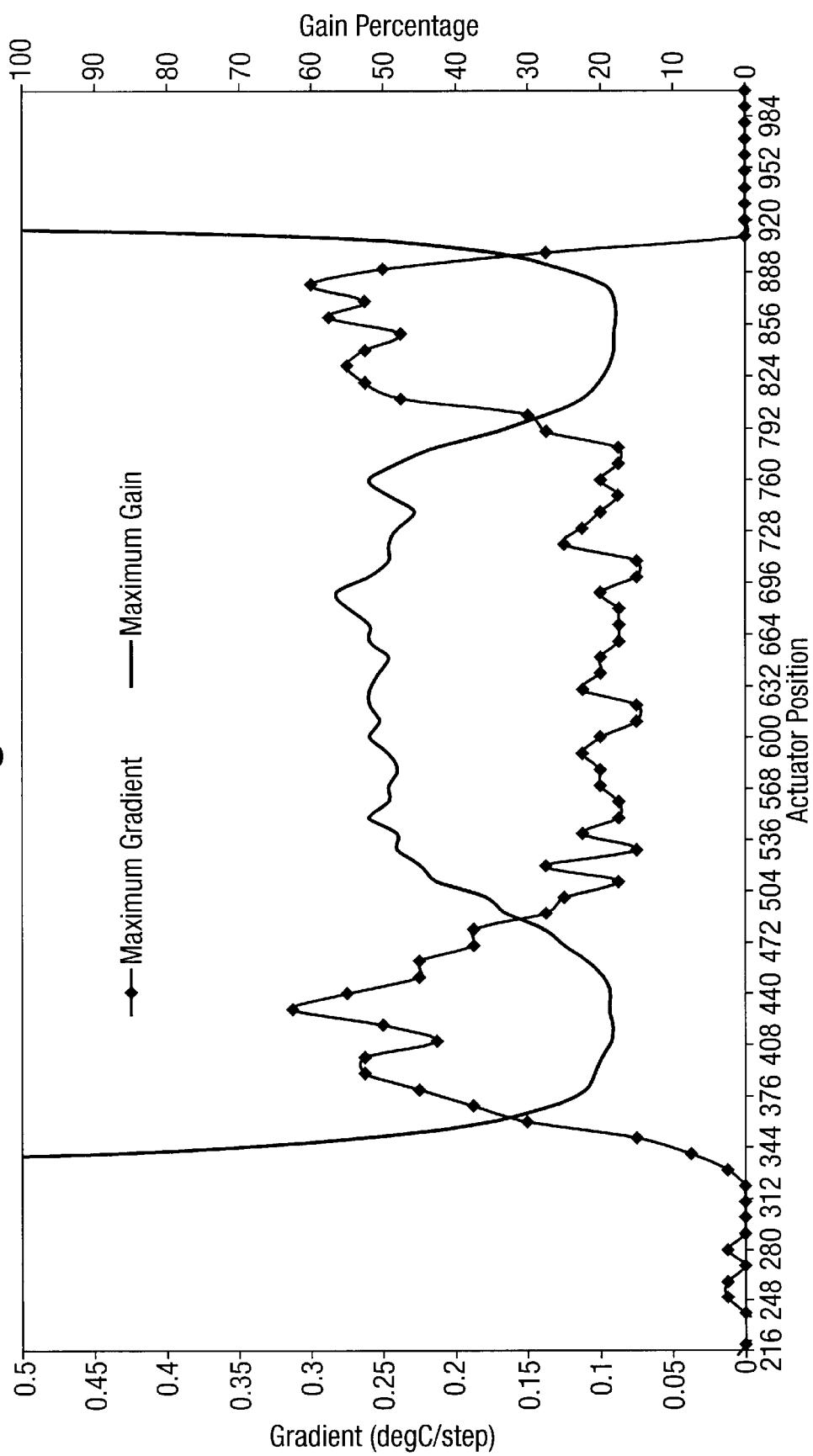
FIG. 11 represents the maximum gradient curve for FIGS. 9 and 10.

The behaviour of the valve with different external water connections can be characterised during the design process. This will yield a graph (FIG. 9) containing a set of curves representing blended water temperature against valve position. Mathematical differentiation of these curves will produce a graph of gradients against valve position (FIG. 10). A new curve representing the maximum gradient at every position can be derived (FIG. 11). For the system to operate as fast as possible and to be stable for all external water connections the maximum controller gain must be proportional to the inverse of the maximum gradient curve at every position. In FIG. 11 the maximum controller gain (derived from the maximum gradient curve) is shown with respect to the actuator position, it has been averaged to give a smoother curve.

Where the mixing valve apparatus is used to mix hot and cold water for domestic use, such as for a shower, the temperature of the hot water at the inlet 14 may be unsafe to be dispensed from the outlet 16. In particular, where the apparatus is to be used by, for instance, children or the elderly, there may be a danger of the control panel 8 being set to a temperature which is too high.

It is possible to provide a mechanical stop on the control knob of a control panel 8 preventing the control knob from being turned beyond a selectable maximum temperature. Also, it is possible to include alternative means on the control panel 8 for setting electronically a maximum selectable temperature. Unfortunately, these arrangements have the disadvantage that the user may inadvertently override or change the preselected maximum temperature and then select a temperature which is too high.

In order to overcome this, as illustrated in FIG. 1, the control system 6 may, itself be provided with an input 36. Be input 36 is used to set the maximum temperature which can be selected by the control panel 8. Once installed, the control system 6 and mixing valve 2 will be generally inaccessible. Therefore, using the control panel 8, the user will only be able to select temperatures up to the maximum temperature selected by the input 36 The input 36 may take any suitable form, for example a slider or rotatable knob operating for instance a potentiometer or up and down buttons used in conjunction with a display on the control system 6 itself or on the control panel 8. In some embodiments, the input 36 could also be provided by a control which is operable only by a special tool, for instance a slotted head to be turned by a screwdriver.

In previous arrangements where a preselectable maximum temperature is provided, there is a disadvantage that only part of the range of movement of the control knob is ever used. It is now recognised that it would be advantageous to give always the control knob its full range of movement, but vary the sensitivity so that its maximum position corresponds to the preselected maximum temperature. In other words, the scale used by the control panel 8 is automatically adjusted. This allows optimum use of the control knob such that with a lower preselected maximum and, hence, small range, the control knob allows more accurate control of temperature.

This arrangement is particularly advantageous where the maximum temperature is set electronically, rather than as a mechanical stop. In this respect, the scale for the input control of the control panel 8 can be adjusted to cover only the temperature range defined by the maximum temperature set by the input 36.

In some arrangements, the control knob may be provided with a corresponding display scale of unmarked dimensions. For instance, the display scale may range from "MIN" to "MAX" with a plurality of divisions in between. However, where the display scale indicates specific values such as temperatures, it is preferable that the display is adjusted automatically according to preselection of the maximum temperature so as to show appropriate values up to the maximum value.

In a further arrangement means are provided to preselect minimum temperature. In this case, the control system can adjust the ranges and display of the control panel 8 accordingly.

Figure 7A:
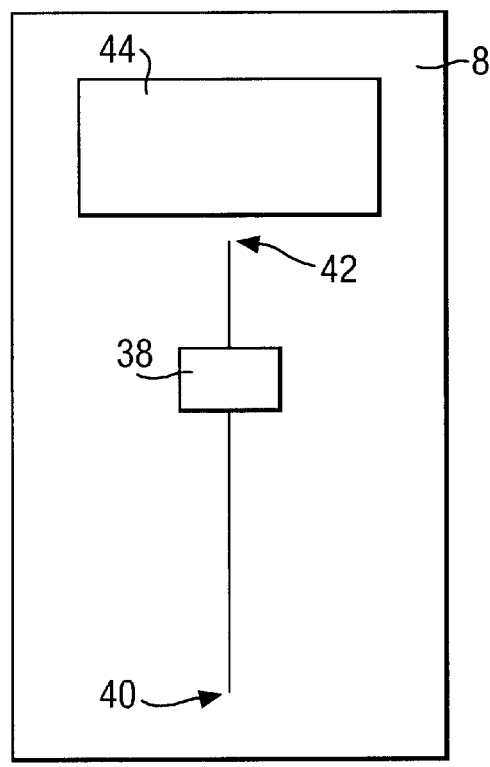
FIGS. 7(a) and (b) illustrate embodiments of control panels.
Figure 7B:
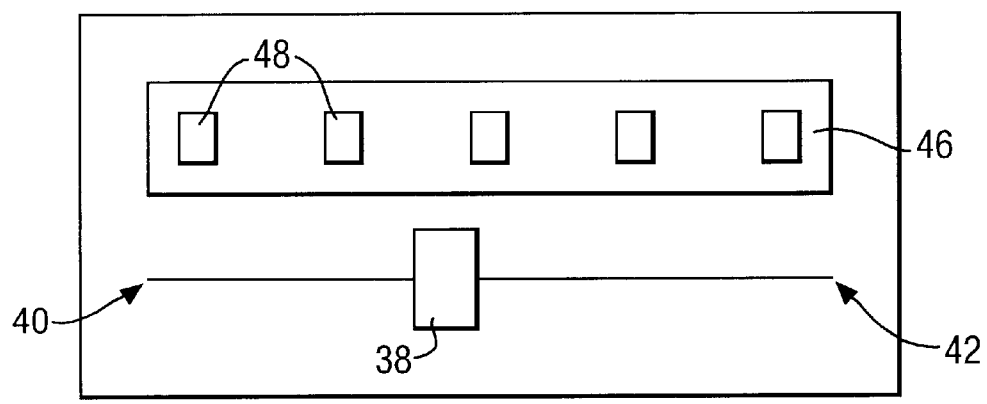

FIG. 7(*a*) illustrates a control panel 8 having a slider 38 for selecting the desired temperature. The slider 38 may move from a minimum temperature position to a maximum temperature position 42. The control system 6 allocates the maximum temperature position 42 to the maximum temperature selected by input 36. In this way, the full range of movement of the slider 38 is available to select the desired temperature. Indeed, in normal use, the operator would be unaware of the maximum temperature setting.

Optionally, a display 44 may be provided to display the selected temperature.

FIG. 7(*b*) illustrates a control panel 8 with a similar slider 38 having maximum and maximum temperature positions 40,42. The control panel 8 is provided with a display 46 providing a representation of the selectable temperature scale alongside the slider 38. The display 46 includes segments 48 displaying selectable temperatures. Hence, the scale represented on the display 46 and the temperatures indicated in the segments 48 are determined according to the range of temperatures selectable up to the maximum selected by input 36. The display 46 may be embodied as an LCD or such like and thereby easily allow a variety of scales and alphanumeric characters to be represented.

Of course, it will be appreciated that the same principles may be applied to other forms of control panel 8, such as those with rotary knobs.

It is possible for the system to control an external or internal water pump. This pump is switched on when the valve is opened and off when the valve is closed. Preferably the pump switch-on is delayed when the valve is opened. This allows the valve to move through the cold position before the pump increases the flow rate. This minimises the unwanted cold water supplied during start up.

Where a valve, such as illustrated in FIGS. 2 and 3, controls a flow of fluid by means of a valve servo, there is a problem that, should there be a power failure whilst operating, the valve will remain open indefinitely and continue to supply fluid.

As illustrated in FIG. 8, the control system 6 is provided with an electrical power input 50 and an electrical energy store 52. Although illustrated as a separate component, the electrical energy store 52 is preferably embodied as an internal part of the control system 6 as illustrated in FIG. 1.

Thus, during normal operation, the control system 6 operates under the power of the electrical power input. However, in the event of a power failure, power is supplied from the electrical energy store 52. In particular, the control system 6 makes use of the energy available from the electrical energy store 52 to operate the valve servo 4 to move the valve to a closed position, in other words, to shut the valve off and drive it to a position in which no flow occurs through the valve.

The electrical energy store 52 is preferably maintained in a charged state by the electrical power input 50 during normal use. In other words, the energy store 52 is of a rechargeable nature.

Rather than use some form of battery, it is proposed to use a capacitor as the electrical energy store.

Non-rechargeable batteries would obviously need replacing. Compared to capacitors, rechargeable batteries tend to have a lower energy density; need a complex charging circuit; and have a more limited charge/discharge life. They are also of generally low voltage such that it would be necessary to step up the voltage from about 1.5V to about 40V in order to drive the motor.

In order that the capacitor can provide sufficient power to operate the valve, it is preferred that it should be charged to a relatively high voltage since the energy stored is proportional to the square of voltage, but only increases linearly with the value of the capacitor. Ideally, the energy should be stored at the highest voltage possible.

With a view to safety issues in domestic water installations, it is preferred that the capacitor is charged to at least 40 volts and preferably at least 50 volts. For instance, if the energy is stored on the low voltage side of the transformer, there is a practical limitation of 42.4V imposed by the relevant safety standards in the United Kingdom. Hence, in this instance the energy would be stored at 42.2V. Mains 230V ac could be stepped down to a safe low voltage through a transformer and then rectified to d.c. In order to store the energy at a higher voltage, then an alternative approach would be to use a switched mode power supply solution. Such a system would require that the incoming 231 Vac mains is rectified to d.c. and the energy stored at this point. A switched mode power supply circuit would then be used to translate this down to a safe isolated d.c. voltage.

In this way, a smaller capacitor may be used for a given energy, thereby resulting in reduced cost and space.

In the event of a power failure, the control system 6 may estimate the power required to move the valve to its off position, i.e. with no flow. This will, of course, vary according to the current position of the valve. The control system 6 may also estimate the available amount of electrical energy remaining in the electrical energy store 52. Thus, the control system 6 may allow the valve apparatus to continue operating with the selected flow until it determines that the energy stored in the electrical energy store 52 is approaching the amount required to shut off the valve. Thus, in the event of a momentary interruption in the power supply, the control system 6 will not unnecessarily shut off the valve.

In order to minimise the size of electrical energy store 52 required and/or to maximise the time for which the apparatus may continue to fiction during a power failure, the control system 6 may shut off power to unnecessary parts of the apparatus under its control. In other words, in the event of a power failure, the control system 6 may only allow continued supply of power to some of the components in the overall apparatus. For instance, if the control panel 8 is provided with a display and/or illumination, this can be turned off. The control system 6 can be turned off and the valve actuator will only be operated in response to abnormal conditions. Similarly, digital communications with the control panel of other accessories can be turned off.

Of course, preferably, the control system will only allow the flow to continue provided it remains wit certain limits and not regardless of inlet conditions.

During normal use of the control system 6 and valve, the valve and valve servo are used with little consideration of power consumption, but more concern for optimising speed and control. In the event of a power failure, the control system 6 may control the valve servo in a different manner. In particular, it may supply power to the valve servo in such a way as to optimise movement of the valve to its off position. In other words, the trajectory of movement of the valve servo and valve is chosen so as to bring the valve to its position of no flow using the minimum amount of energy as possible. Thus the system may operate using he most efficient motor drive current and the most efficient speed for the motor. The most efficient mode of the power supply could also be used where, for instance, a switch mode power supply is used.

It is possible to use a stepper motor as the valve servo. As is well known, it is possible to operate a stepper motor by half steps. Thus, it is proposed that, during normal use, in order to provide maximum control, the stepper motor would-be operated by half steps. However, in the event of a power failure, the control system 6 operates the stepper motor by whole steps in order to move the valve to its off position as quickly and efficiently as possible.

With some valves, for instance that illustrated in FIGS. 2 and 3, it is possible that a state of no-flow will be achieved at two positions of the valve For the embodiment of FIGS. 2 and 3 when used for supplying a mix of hot and cold water, the control system 6 may be configured so as normally to always move the valve to an off position adjacent maximum cold water supply. In this way, upon starting use of the apparatus, the user will always be provided with cold water before hot, thereby avoiding a user from being unnecessarily scalded. However, the control system could be configured such that, in the event of a power failure, it moves the valve to the nearest off position, whether or not his is adjacent the hot or cold water supply.

Although it is possible for the valve servo 4 to be connected directly to the valve 2, in order to achieve good control of the valve 2, movement of the valve servo will often exceed that required for the valve 2. In other words, a gear train is used between the valve servo and valve 2. Unfortunately, gear trains of any type may result in some back lash. In other words, when reversing the direction of movement of the valve servo 4, the back lash in the gear train will have to be taken up before movement in the valve 2 starts.

In the illustrated embodiment, the gear train is formed internally of the housing of the valve servo 4.

As illustrated in FIG. 1, a sensor 54 may be provided on the valve 2 or at least on a shaft directly connected to the movement of the valve 2. The control system 6 may then operate a start-up procedure to determine the back lash in the gear train.

The detector 54 need only detect a single predetermined position of the valve 2.

The control system 6 then moves the valve servo in one direction by an amount sufficient to take up any back lash in the gear train and past the at least one position detected by the detector 54. Having determined from the detector 54 that the valve 2 has moved past the predetermined position, the control system 6 then reverses the direction of the valve servo 4 until the valve 2 once again passes the position detected by the detector 54. In a perfect system, the amount by which the valve servo 4 is operated to return the valve 2 to the detected position will be the same as the amount by which it was moved away. However, in practice, the valve servo 4 will have to be operated by a greater amount to return the valve 2 to the detected position. The additional amount by which it is operated represents the back lash in the gear train.

Having determined the back lash in the gear train, the control system can then use this information when operating the valve servo 4 to move the valve 2 during normal use. In particular, when the valve servo 4 is used to move the valve 2 in a direction opposite to the previous direction of movement, then the control system 6 will operate the valve servo 4 by an additional amount to compensate for the back lash in the gear train.

In this way, the control system can achieve much greater accuracy and speed of operation.

In order to provide good sealing operation, valves are constructed with resilient seals which press against sealing surfaces. For instance, in the valve illustrated in FIG. 2, the cup seals 22,24 seal against the surface 26 of the valve member 20. When a valve is not operated for a long period of time, the material making up the resilient seals may start to adhere to the sealing surface such that when the valve is next used the resilient seals may be damaged. Also, the stiction effect of the seals on the disk surface 26 causes the operating torque to rise with time. High stiction between the seals and the disk surface could cause the valve to jam in the off position or could have a detrimental effect on the gear box in the long term.

In-operation may occur for a number of reasons. For instance, where the apparatus of Figure us used for mixing hot and cold water for a domestic shower, the shower may be used only occasionally.

It is now recognised that, by operating the valve regularly, the stiction is prevented from growing unduly. In this regard, the control system 6 may include a timer and may monitor how long it has been since the valve 2 was last operated. When the time since last operation exceeds a predetermined limit, the control system 6 may then operate the valve servo 4 so as to move the valve 2. Movement of the valve 2 need only be very slight, in particular, enough only to slide the resilient seal in either direction. Preferably, the construction of the valve 2 is such that slight movement is possible in the no-flow state so that the valve and resilient seals can be moved sufficient to slide the seals without starting any flow through the valve 2. Of course, even if this is not possible, the movement will be so small and so quick that barely any flow will occur through the value 2.

For a domestic shower application, it is common that the valve would be operated every 24 hours. In this case, the control system 6 should use a predetermined period of more than 24 hours for automatic movement of the valve 2. For instance, a period of approximately 30 hours allows for a user to be running slightly later than normal in his or her daily routine and, in comparison to a period of approximately 24 hours, would, in those circumstances, avoid the user hearing the automatic operation. On the other hand, with a period of approximately 20 hours, where the shower is used in the morning, it would not be operated until the middle of the night and, therefore, would not be noticed. Certainly, there is little need for automatic operation within 12 hours and, in practice, automatic movement once every week would be sufficient.

In a control system having a control loop based on the detected mix conditions, the control loop includes a gain and damping appropriate to give an optimum response under usual working conditions. However, it is now recognised that in some circumstances, such as failure in the installation or fluid supply, the response of the normal control loop will not be adequate. Hence, it is proposed that the control system 6 includes a transient detector control loop 56 independent of the normal temperature control loop and that it uses this to shut off the valve 2 during exceptional circumstances.

The control system as discussed above will attempt to minimise the error between a demand value, e.g. requested temperature, and an actual plant output value, e.g. measured temperature. However, no control system can react infinitely fast to changes in input conditions. It is possible to increase the gain of the feedback system such that a small change in error causes a large corrective action. However, this can lead to instability in the control loop under normal conditions.

It is possible for input conditions to change dramatically and these instances here are described as transients. In a domestic shower installation there may be a loss of cold water supply. In this case, there would be a risk that the normal control loop would not be able to control the valve sufficiently fast so as to prevent a slug of pure hot water reaching the user. With a fast temperature probe and high feedback, it is possible to limit the amount of temperature over shoot. However, in practice, it is desirable to use a low-cost controller system and low-cost temperature probes, e.g. thermistors, which are slower.

It is proposed that a transient detector control loop 56 should be provided independently of the normal control loop, either as a separate software routine or as an independent processor within the control system. Thus, for the arrangement of FIG. 1, unlike the normal temperature control loop, the transient detector control loop 56 would continuously monitor the actual temperature, rather than the demand temperature. It is then arranged so as to predict what a faster temperature probe would have seen in the system.

In particular, the transient detector 56 works by continuously monitoring the rate of change in temperature detected by the temperature sensor. By knowing the time constant of the sensor, the transient detector 56 can then predict what temperature the device is actually "seeing". For example, a thermistor might take 0.3 seconds to register 30% of a change in temperature. In this case, if the transient detector 56 monitors a 4-C change in 0.3 seconds, it can predict an actual change of 12-C.

If the transient detector 56 detects that a safe time/temperature profile has been exceeded, it overrides the normal temperature control loop and forces the control system into a "transient" state. A profile of acceptable temperatures above the demanded value with respect to time can be used to trigger the transient detector if exceeded.

If the transient detector 56 is triggered, there is no attempt to use the normal temperature control loop, for instance by dynamically changing the gain. The transient detector 56 suspends the normal temperature control loop (FIG. 5) takes control of the valve and causes the valve to be driven immediately to the full cold or off position. In particular, it ensures that the hot water is reduced to substantially zero.

Once the detected temperature falls below the demand temperature by a predetermined threshold, the transient detector 56 may then relinquish control to the normal temperature control loop again.

In this way, the normal temperature control loop may be designed for optimum performance whilst the transient detector 56 provides a separate safeguard against unwanted transients in the water supply.

For the arrangement of FIG. 1 used for an ablutionary shower, it is important that failure does not result in the supply of only hot water. Hence, it is proposed that the control system 6 also includes an error detection circuit 58 for detecting errors in the apparatus and the operation of the system. In particular, it may then operate a fail-safe mode.

The role of the error detection is to detect whether there is an abnormal fault condition which may have a safety implication and to take appropriate action.

The temperature sensor, for instance thermistor, can fail open-circuit or closed-circuit. If it fails open-circuit, for instance because a wire becomes detached, the high resistance can look like a cold temperature and, hence, the control loop will move the valve to full hot. On the other hand, a short-circuit failure will look like a very hot temperature and, hence, the valve will move to full cold.

The normal range of interest would be 15-C to 55-C. Hence, it is proposed that should the system detect temperatures below or above these limits, then it will determine that an error has occurred and turn off the valve.

In one embodiment, a negative temperature coefficient (NTC) thermistor is used whereby the resistance fall with increasing temperature. The resistance of the thermistor is converted to a voltage level via signal conditioning circuitry with this voltage level being presented to an analogue to digital convertor. The signal conditioning circuitry can be designed such that the voltage levels are constrained to the dynamic range of the ADC (eg. 0V to 5V) and designed such that 0V (for example) corresponds to one extreme of temperature range (for example, the minimum) and 5V (for example) corresponds to another extreme of temperature (for example, the maximum) which it is desired to measure. Temperatures outside of these extremes would be clipped to 0V or 5V respectively.

The most likely failure is where a thermistor becomes disconnected and hence the measured resistance appears very large corresponding to a very low temperature. Such a condition is very hazardous since the control system, in measuring an apparently low temperature, would move the valve to the full hot position if the desired set temperature could not be obtained. By exploiting the fact that the temperature of the water will never be less than 0 deg C. under normal operating conditions, this temperature (or less) can be detected as an illegal temperature and the control system 6 configured to turn the valve off under such conditions. It will also be recognised that other temperatures can be selected as an appropriate threshold.

Another common failure is for he thermistor or connecting circuitry to short circuit such that the resistance appears very small. This condition can also be detected if the signal conditioning circuitry is scaled such that the maximum temperature measureable by the ADC can be known to be a temperature which can never occur under normal operating conditions. A good example is 100 dec C. in a water mixing valve. It will be recognised such that other maximum temperatures can also be selected.

In this way, if the control system detects the illegal states of 0° C. or 100° C. (+/− a tolerance), then an error can be flagged and the valve turned off.

In another embodiment, two comparators may be used which detect the illegal states and provide a single bit indication to the control system.

As discussed above, the selectable maximum temperature control 36 may use a potentiometer to alter the selected maximum temperature. If the potentiometer were to fail (open circuit or short circuit) then a previously safe temperature, for instance 35° C., could potentially revert to the maximum selectable temperature of for instance 55° C. By associating the minimum position of the selectable temperature with zero resistance, then a short circuit will always fail safe and need not be detected. On the other hand, by associating the magnum selectable temperature with the maximum potentiometer resistance, it is possible to detect an open circuit, for instance by way of an external fixed resistor in series with the potentiometer.

If the control panel 8 becomes disconnected from the control system 6 during use, this is a potentially hazardous situation. In this respect, it is proposed that the control system continually checks for valid signals from the control panel and switches the valve off if invalid conditions are detected. For analogue control panels, this requires checking valid signal levels and for digital control panels, this requires checking that the unit can communicate.

This gives the ability to plug either analogue or digital control panels or accessories at different times to the same port. The valve controller can reconfigure itself accordingly. Additionally, if the control panel or accessory is disconnected, the controller will detect this and shut down.

As mentioned, the control panel 8 is connected to the control system 6 by means of a transmission path 10. The transmission path 10 allows the connection of various control panels to the control system 6. In this regard, the control system 6 is provided with a control interface. Upon connection of a control panel 8, the control system 6 may analyse it to determine its type.

The system uses a single input port to support an analogue electronic control panel and a digital electronic control panel. The input port has 6 lines and they are configured as shown in table 1. According to an aspect of the present invention, by configuring analogue and digital control panels according to these criteria, the valve system can distinguish between the control panels and configure itself accordingly. The analogue control panel uses 2 lines varying between 0V and 5V to represent the demand temperature and the status of the control panel buttons. The digital panel uses the I²C Acess Buss digital communications protocol operating at 16 kHz to transfer data about the demand temperature and button presses. The system has the ability to identify which of the 2 panel types are connected by inspecting the signal levels on another line (line 6) on the input port.

| Line | Valve | Analogue Panel | Digital Panel |
| --- | --- | --- | --- |
| 1 | 1 M pull-up | On/Off indicator | N/C |
| 2 | Switched 5 V | 5 V | 5 V |
| 3 | 1 M pull-down, RC filter and 51 R to I²C | 10 k Pot with 1 K series resistor to GND | SDA |
| 4 | RC filter and 51 R to I²C | Mode selector | SCL |
| 5 | GND | GND | GND |
| 6 | 1 M pull-up | Flow indicator | 10 k pull-down |

Figure 12:
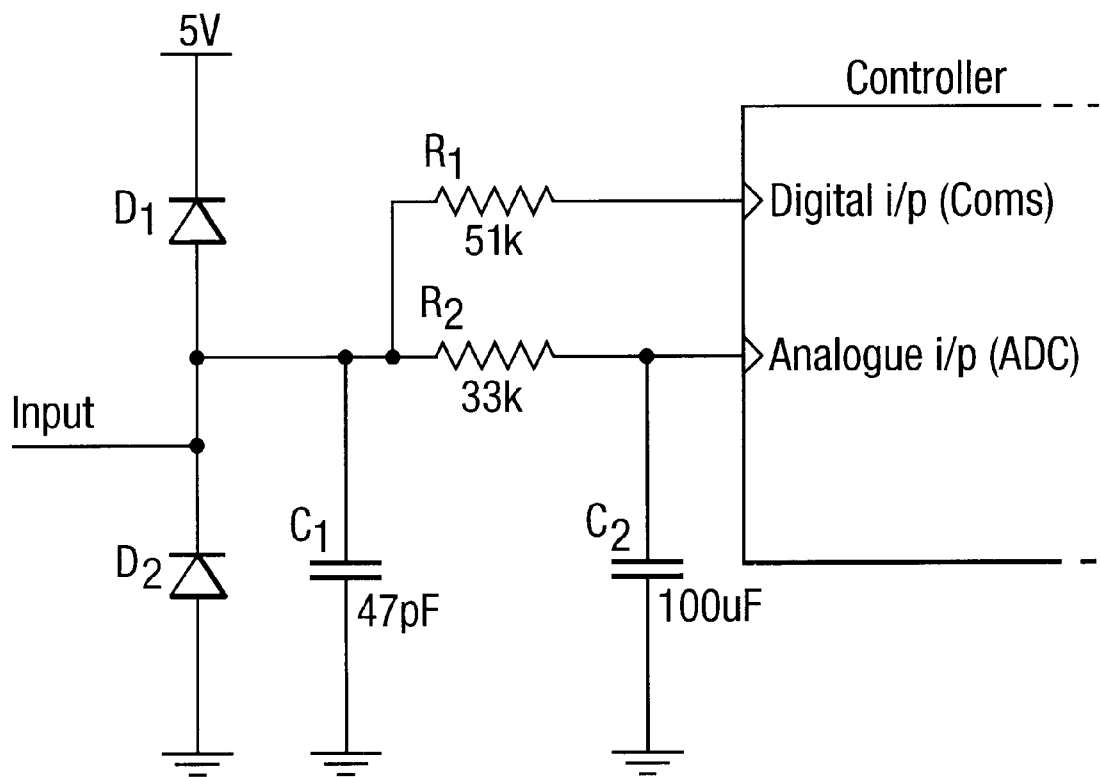
FIG. 12 illustrates au input termination circuit.

The digital communications uses two of the same input port lines as the analogue panel. The dual function of these lines is allowed by the configuration shown in FIG. 12. Each electrical valve system input line is terminated in the same way. The clamp diodes D1 and D2 protect the terminating circuit from over and under voltage conditions. C1 and R1 are required by the digital communications. R2 and C2 provide filtering of the analogue input signals. When the digital communications are in use R2 prevents the relatively high capacitance of C2 from disrupting the communications. The presence of C2 in close proximity to the ADC (analogue to digital converter) gives added noise immunity to the ADC. The shown values of R2 and C2 are not specific to the invention, they can be altered to tune the level of filtering on the analogue signals. It is a requirement that R2 has high impedance with respect to R1.

The digital protocol allows devices other than a control panel to communicate with the valve system. This could include pumps, bath fill systems, hand wasers, extractor fans, lighting systems or others. The protocol defines a message format shown in table 2.

| Byte | Meaning |
| --- | --- |
| 0 | Destination Address |
| 1 | Source Address |
| 2 | Command Number |
| 3 | Payload byte 0 |
| 4 | Payload byte 1 |
| 5 | Payload byte 2 |
| 6 | CRC High-byte |
| 7 | CRC Low byte |

There are a number of available commands to allow communication of system status, temperatures and flows (table3).

| Command | Function | Code |
| --- | --- | --- |
| MSG_ENQUIRY | Report system status | 1 |
| MSG_SET_MODE | Switch valve on or off | 2 |
| MSG_SET_TEMP | Set temperature (in eighths of a degree) | 3 |
| MSG_SET_FLOW | Switch pump on or off | 4 |
| MSG_QUERY_TEMP | Report temperature (in eighths of a degree) | 5 |
| MSG_QUERY_FLOW | Report pump status | 6 |

We claim:

1. A mixing valve apparatus including:
   a mixing valve for mixing water from a cold water inlet and a hot water inlet and supplying the mixed water to a water outlet, the inlets and outlets being for connection to an external water system;
   a valve servo for moving the position of the valve; and
   a control system for operating the valve servo and thereby controlling flow from the water outlet; wherein
   the control system includes a control loop for use in operating the valve servo and is arranged and configured to assume, when the mixing valve is not used only for a very short period of time, that the conditions of the external water system have not changed and to jump start the control loop to restore the valve to its position as previously used.

2. A mixing valve apparatus including:
   a mixing valve for mixing water from a cold water inlet and a hot water inlet and supplying the mixed water to a water outlet, the water inlets and outlets being for connection to an external water system;
   a valve servo for moving the position of the valve;

a control system for operating the valve servo and thereby controlling at least the temperature at the water outlet; wherein the control system is arranged and configured to provide respective characterizations for a plurality of external water systems, each characterisation providing an indication of outlet water temperature for mixing valve position on the basis of inlet water properties for the respective external water system, and the control system is arranged and configured to identify the characterization for the external water system in which the mixing valve is connected and to optimize control of the valve according to the characterisation.

3. A mixing valve apparatus according to claim 2 wherein the characterisation takes account of at least one of inlet water flows, pressures and temperatures.

4. A mixing valve apparatus according to claim 2 wherein the characterisation used by the control system may be selected by the user.

5. A mixing valve apparatus according to claim 2 wherein the control system automatically determines the characterisation on the basis of operating conditions of the valve.

6. A mixing valve apparatus according to claim 5 wherein the operating conditions include the mixed temperature at the outlet and the position of the mixing valve.

7. A mixing valve apparatus according to claim 5 wherein the operating conditions include change of position of the mixing valve with respect to change in the actual mixed water temperature at the outlet.

8. A mixing valve apparatus according to claim 6 wherein the operating conditions include the temperature of the input hot water.

9. A mixing valve apparatus according to claim 2 wherein the control system determines the characterisation with respect to time.

10. A mixing valve apparatus according to claim 9 wherein the control system compensates for dead lag in pipes supplying the mixing valve inlets according to the time since the mixing valve was last used.

11. A mixing valve according to claim 2 wherein, upon start up, the control system makes use of the characterisation to move the valve to a position predicted to produce the required temperature at the water outlet.

12. A mixing valve apparatus according to claim 2 wherein, when the mixing valve is not used only for a very short period of time, the control system assumes that the conditions of the water system have not changed and jump starts a start up control loop to restore the valve to its position as previously used.

13. A mixing valve apparatus including:
a mixing valve for variably mixing hot and cold water,
a valve servo for moving the mixing valve;
a control system for operating the valve servo so as to provide a desired mixed water temperature; and
a control panel remote from the mixing valve and valve servo for providing a control signal to the control system to select the desired temperature; wherein
the control system includes a maximum temperature selector by which a user may specify a maximum mixed water temperature selectable by the control panel; and wherein
the control panel includes a display of selectable mixed water temperatures, the display only showing temperatures up to the selected maximum mixed water temperature and the display has a fixed predetermined extent, the scale of which is varied according to the selected maximum mixed water temperature.

14. A mixing valve apparatus according to claim 13 wherein the maximum temperature selector is provided proximate the valve and the valve servo.

15. A mixing valve apparatus according to claim 13 wherein the control panel includes a member movable between two predetermined end positions to select the mixed water temperature and wherein one of the predetermined end positions selects the selected maximum mixed water temperature and the scale of selectable mixed water temperatures between the two predetermined end positions is adjusted according to the selected maximum mixed water temperature.

16. A mixing valve apparatus including:
a cold water inlet and a hot water inlet;
a mixing valve for mixing water received at the cold water inlet and the hot water inlet and supplying the mixed water to a water outlet, the inlets and outlets being for connection to al external water system;
a valve servo for moving the position of the valve; and
a control system for operating the valve servo and thereby controlling flow from the water outlet, the control system including a temperature sensor for providing an indication of the temperature at the water outlet and a control loop for comparing the desired temperature with that provided by the temperature sensor so as to operate the valve servo; wherein
the control system additionally includes a transient detector for determining from the temperature indicated by the temperature sensor transients in the properties of the water received at the cold water inlet and the hot water inlet and overriding the control loop to control the valve servo in the event of a transient.

17. A mixing valve according to claim 16 wherein, in the event of a transient the valve servo is controlled to rapidly reduce the supply of water from the hot water inlet to the water outlet to substantially zero.

18. A mixing valve apparatus according to claim 16 the transient detector continuously monitors the rate of change in temperature indicated by the temperature sensor.

19. A mixing valve apparatus according to claim 18 where the transient detector predicts the actual temperature at the water outlet from the rate of change in temperature indicated by the temperature sensor and the time constant of the temperature sensor.

20. A mixing valve apparatus including:
a mixing valve for mixing water from a cold water inlet and a hot water inlet and supplying the mixed water to a water outlet, the inlets and outlets being for connection to an external water system;
a valve servo for moving the position of the valve; and
a control system for operating the valve servo and thereby controlling flow from the water outlet; wherein
the control system includes an error detection circuit for detecting at least one of the following:
failure of a temperature sensor providing an indication of the temperature at the outlet;
failure of a selected intermediate maximum temperature for delivery from the outlet; and
disconnection of a control panel for controlling the control system.

21. A mixing valve apparatus according to claim 20 wherein the error detection circuit only recognises indications of the temperature between predetermined limits as valid temperatures and determines failure of the temperature sensor when the indication of temperature is outside the predetermined limits.

22. A mixing valve apparatus according to claims 20 wherein the intermediate maximum temperature is selected using a potentiometer, the maximum selectable intermediate maximum temperature being selected with the potentiometer at its maximum resistance and a fixed resistor being provided in series with the potentiometer such that higher resistances are detected as errors.

23. A mixing valve according to claim 22 wherein the minimum temperature selectable as the intermediate maximum temperature corresponds to a closed circuit such that an unwanted short circuit fails safe.

24. A mixing valve apparatus according to claim 20 wherein the error detection circuit regularly checks for valid signals from the control panel and detects an error when no valid signal is received.

25. A mixing valve apparatus according to claim 24 wherein, for analogue control panels, the error detection circuit checks for valid signal levels, and, for digital control panels, the error detection circuit checks that the control panel can communicate.

26. A mixing valve apparatus including:
   a mixing valve for mixing water from a cold water inlet and a hot water inlet and supplying the mixed water to a water outlet, the inlets and outlets being for connection to an external water system;
   a valve servo for moving the position of the valve; and
   a control system for operating the valve servo and thereby controlling flow from the water outlet; wherein
      the control system stores information relating position of the valve and valve servo to temperature at the outlet and, upon start-up, when a desired temperature is selected, initially operates the valve servo to move the valve to the position stored for the selected temperature.

27. A mixing valve apparatus including:
   a mixing valve for variably mixing hot and cold water;
   a valve servo for moving the mixing valve;
   a control system for connection to a remotely located control panel and for operating the valve servo so as to provide a desired mixed water temperature according to the control panel; wherein
      the control system includes an input port suitable for connection selectively to an analogue control panel and a digital control panel.

28. A mixing valve apparatus according to claim 27 wherein the input port includes six lines of which two lines are suitable for analog control signals.

29. A mixing valve apparatus according to claims 27 wherein the input port includes an input termination circuit.

30. A mixing valve apparatus according to claim 29 wherein the input termination circuit includes:
   a fist capacitor between ground and an input port;
   a first resistor between the input port and a digital input;
   a second resistor between the input port and an analog input; and
   a second capacitor between the analog input and ground; wherein
      the second resistor has a higher impedance with respect to the first resistor.

* * * * *